United States Patent
Al-Shaibani et al.

(10) Patent No.: US 11,759,044 B2
(45) Date of Patent: Sep. 19, 2023

(54) SYSTEM AND METHOD FOR CONTROLLING THE BREW PROCESS OF A COFFEE MAKER

(71) Applicant: Auroma Brewing Company, Wilmington, DE (US)

(72) Inventors: Rayan Al-Shaibani, Shenzhen (CN); Pawin Wongtada, Shenzhen (CN); Ornicha Srimokla, Shenzhen (CN)

(73) Assignee: Auroma Brewing Company, Wilmington, DE (US)

( * ) Notice: Subject to any disclaimer, the term of this patent is extended or adjusted under 35 U.S.C. 154(b) by 111 days.

(21) Appl. No.: 16/912,504

(22) Filed: Jun. 25, 2020

(65) Prior Publication Data
US 2021/0145202 A1 May 20, 2021

Related U.S. Application Data

(63) Continuation of application No. 15/331,914, filed on Oct. 24, 2016, now abandoned.
(Continued)

(51) Int. Cl.
| | |
|---|---|
| A47J 31/52 | (2006.01) |
| A47J 31/00 | (2006.01) |
| A23F 5/26 | (2006.01) |
| A47J 31/40 | (2006.01) |
| A47J 31/42 | (2006.01) |
| A47J 31/053 | (2006.01) |

(52) U.S. Cl.
CPC ............ *A47J 31/002* (2013.01); *A23F 5/262* (2013.01); *A47J 31/053* (2013.01); *A47J 31/404* (2013.01); *A47J 31/42* (2013.01); *A47J 31/525* (2018.08); *A47J 31/5253* (2018.08)

(58) Field of Classification Search
CPC ...... A47J 31/053; A47J 31/002; A47J 31/525; A47J 31/5253; A47J 31/42
USPC .................................................... 99/308, 283
See application file for complete search history.

(56) References Cited

U.S. PATENT DOCUMENTS

| | | |
|---|---|---|
| 1,039,854 A | 10/1912 | Wear |
| 1,069,064 A | 7/1913 | Holton |
| (Continued) | | |

OTHER PUBLICATIONS

YouTube, "Making Coffee With The RAFINO" (online) (retrieved from the internet on Dec. 1, 2017), Mar. 23, 2016 (Mar. 23, 2016); entire document, especially p. 3, Fig 1; p. 5, Fig. 1; p. 1, Fig. 1; p. 6, Fig 1; 1:45-2:00; 2:00-2:30.

*Primary Examiner* — Reginald Alexander
(74) *Attorney, Agent, or Firm* — Alpine Patents; Brian Van Osdol

(57) ABSTRACT

A coffee brewing system and method that includes a brew chamber that holds a brew solution during a brew cycle and dispenses the brew solution; a water system that dispenses water into the brew chamber; a content sensing system that measures the brew solution contents added to the brew chamber; a temperature control system with a heating element and a temperature sensor; at least one recirculating processing loop with a particle monitor system, wherein the recirculating processing loop circulates brew solution extracted from the brew chamber; and a control system that is communicatively coupled to the content sensing system, the temperature control system and the particle monitor system during a brew cycle, wherein the control system controls a brew cycle based on a selected a specified taste profile.

16 Claims, 20 Drawing Sheets

Related U.S. Application Data

(60) Provisional application No. 62/244,812, filed on Oct. 22, 2015.

(56) References Cited

U.S. PATENT DOCUMENTS

| | | | |
|---|---|---|---|
| 2,045,591 A | 6/1936 | Falia | |
| 2,202,936 A | 6/1940 | Williams et al. | |
| 3,204,764 A | 9/1965 | Klaas | |
| 3,610,540 A | 10/1971 | Krolopp et al. | |
| 3,964,175 A | 6/1976 | Sivetz | |
| 4,046,694 A | 9/1977 | Ellis | |
| 4,605,175 A | 8/1986 | Weber | |
| 5,341,939 A | 8/1994 | Aitchison et al. | |
| 5,417,145 A | 5/1995 | Joseph, Jr. et al. | |
| 5,463,934 A | 11/1995 | Locati | |
| 5,615,601 A | 4/1997 | Eugstar | |
| 5,845,561 A | 12/1998 | Chigira et al. | |
| 6,526,872 B2 * | 3/2003 | Wong | A47J 31/053 99/308 |
| 6,915,733 B1 * | 7/2005 | Langbauer | A47J 31/20 426/433 |
| 6,988,444 B1 | 1/2006 | Pfeifer et al. | |
| 8,495,950 B2 | 7/2013 | Fedele et al. | |
| 8,826,803 B2 | 9/2014 | Mazzer | |
| 9,480,359 B1 * | 11/2016 | Kalenian | A23F 5/262 |
| 2001/0004973 A1 | 6/2001 | Asakawa | |
| 2001/0043954 A1 * | 11/2001 | Sweet | A47J 31/053 99/279 |
| 2005/0242009 A1 | 11/2005 | Padalino et al. | |
| 2007/0187534 A1 | 8/2007 | Anson | |
| 2008/0017042 A1 | 1/2008 | Almblad et al. | |
| 2009/0246341 A1 * | 10/2009 | Pitner | A23F 3/16 99/298 |
| 2011/0212229 A1 | 9/2011 | McLaughlin et al. | |
| 2015/0201796 A1 | 7/2015 | Kuempel et al. | |
| 2015/0257587 A1 * | 9/2015 | Dyavarasegowda | A47J 31/469 99/287 |
| 2017/0119195 A1 | 5/2017 | Al-Shaibani et al. | |
| 2018/0055289 A1 | 3/2018 | Al-Shaibani et al. | |

* cited by examiner

SYSTEM AND METHOD FOR CONTROLLING THE BREW PROCESS OF A COFFEE MAKER

CROSS-REFERENCE TO RELATED APPLICATIONS

This Application is a Continuation Application of U.S. patent application Ser. No. 15/331,914, filed on 24 Oct. 2016, which claims the benefit of U.S. Provisional Application No. 62/244,812, filed on 22 Oct. 2015, both of which are incorporated in their entirety by this reference.

TECHNICAL FIELD

This invention relates generally to the field of coffee makers, and more specifically to a new and useful system and method for controlling the brew process of a coffee maker.

BACKGROUND

Coffee drinking has become a wide spread past time for many people. With the expansion of coffee chains, people have been introduced to a wide variety of coffee drinking options. For many people, these options are only available at a coffee shop. The amount of knowledge and expense of coffee equipment required for some of the customized coffee making techniques generally limits in-home options to dedicated coffee aficionados. In recent years, the market has seen the introduction of many home espresso and coffee machines with a simplified brewing process that mainly rely on prepackaged pods to address some of the in-home coffee demand. However, such systems are closed systems that lock customers into an ecosystem of limited coffee options. Thus, there is a need in the coffee maker field to create a new and useful system and method for controlling the brew process of a coffee maker. This invention provides such a new and useful system and method.

DESCRIPTION OF THE EMBODIMENTS

The following description of the embodiments of the invention is not intended to limit the invention to these embodiments but rather is to enable a person skilled in the art to make and use this invention.

1. Overview

A system and method for controlling the brew process of a coffee maker functions to enable an enhanced level of control over the coffee brewing. The system and method can involve control over grind size, filter size, water temperature, brewing temperature, coffee-to-water ratio, and/or dissolved solid value. The system and method preferably employ automated control over the various variables. The system and method can be applied to consistently brewing customized coffee across a variety of taste profiles. For example, coffee can be customized by strength and extraction. The automated control can be used in producing a particular brewing process, which may be selected from a menu or any suitable option. The automated control can additionally be used in adapting a brew process to one or more user preferences. For example, the system and method could be employed in learning and executing a brewing process that is customized for a particular user. Additionally, a learned taste profile of a user could be translated across different coffee options such as bean or roast variations. A taste profile preferably characterizes preferences across various coffee types and options. A taste profile can be used to determine a brew process configuration, which characterizes how one brew cycle is executed by the coffee maker. In one exemplary usage scenario, after a taste profile is created for a user, that user could select a new type of bean to try and the coffee maker device will prepare a cup of coffee using that bean customized based on the bean and the user preferences. In another application, a set of user test profiles can be used to generate a brew process for a set of users such that people sharing a carafe of coffee have the coffee brewed in a style that may be more enjoyable to the whole group rather than just an individual. The system and method can additionally include an operating mode wherein a set of multiple brew processes can be performed for a single setup, which can function to enable a tasting flight of coffee or per cup customization.

Figure 4:
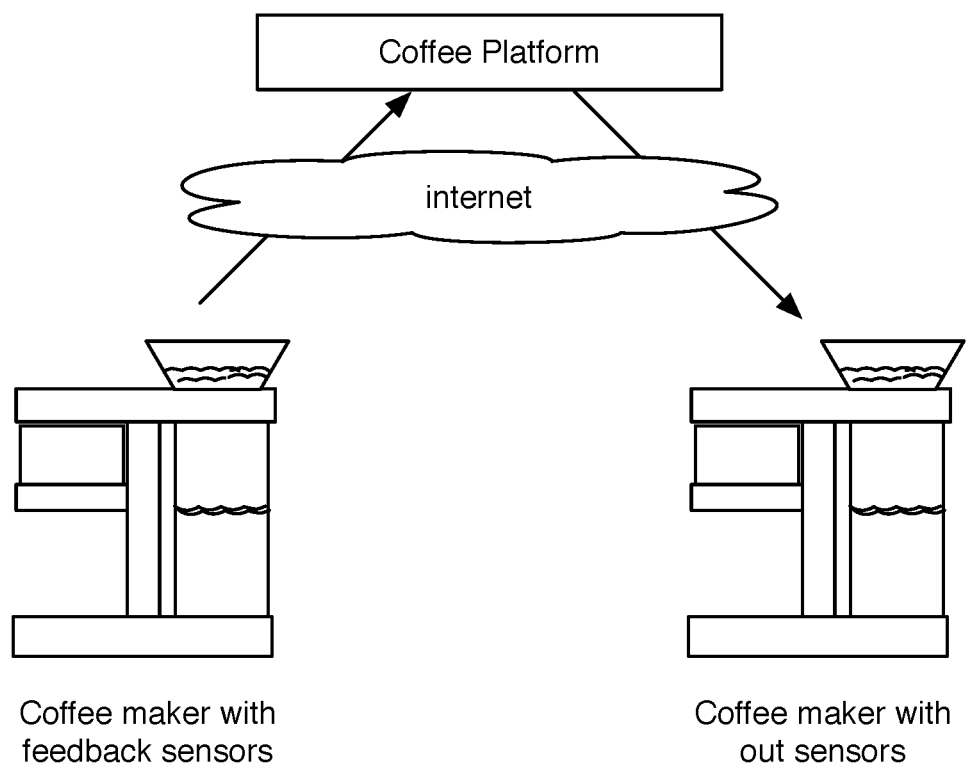
FIG. 4 is a schematic representation of the system sharing control configurations of a system with sensors with a system without sensors.

The system and method may be implemented with sensed feedback within the coffee maker system. Alternative implementations may utilize open loop implementations of a coffee maker system that do not include sensors or as many sensors. In an open loop implementation, control of the coffee maker system can be performed based on predefined expectations. An open loop implementation may utilize more manual settings to define how the coffee maker system performs a particular brew cycle. Fewer or no sensors can lower the production cost of the device and still provide an intelligent brewing process. In one variation, the taste profile and/or a brew process configuration can be manually entered using one or more inputs. Preferably, a sensor feedback implementation system and an open loop implementation can be integrated within a connected platform such that brewing control intelligence can be shared between different models of coffee makers. For example, a premium coffee maker may be able to use integrated sensors to control how a new type of coffee blend is brewed. The control configurations determined using active feedback may be shared through a connected platform such that an open loop system could execute a brew using control settings learned by one or more premium coffee makers as shown in FIG. 4.

As a first potential benefit, the system and method may offer greater flexibility and control when making coffee. The system and method may facilitate trying and using new coffee types by accepting coffee beans and/or coffee grounds as opposed to pre-packaged pods. It would be appreciated that the system and methods could be used with pre-packaged pods as a coffee source. In addition to being compatible with a wider variety of coffee bean sources, the system and method can adapt to different coffee types. More specifically, the system and method can dynamically alter the brewing process for a new coffee type or utilize coffee brew predictions based on information on the coffee type or properties.

As another potential benefit, the system and method can control one or more properties during the brew process so that coffee is produced in a controlled and repeatable manner. The system and method preferably addresses coffee brewing from a parameterized perspective. In particular, the system and method may target particular dissolved particle values in produced coffee. The system and method could additionally or alternatively target brewing time, water and/or brew solution temperature, water-to-coffee ratio, coffee grind size, and/or other properties.

As another potential benefit, the system and method can offer a connected personalized experience for users. The system and method can learn the taste preferences of a user and apply that in future brews. Applications of a user taste profile can include adjusting the brew process configuration used with a new coffee type, mixing taste preferences when brewing for multiple people, targeting different tastes based on the current situation, and other usages. Personalized brewing can additionally benefit from multi-user data. Data analysis of multiple users can be used to improve the experience of individual users.

The system and method described herein are described as being applied to a primary application of coffee, but the described system and method may be applied to cold brews, herbal teas, teas, and/or other suitable drinks and solutions. In one example, a cold brew implementation can forgo heating elements for other temperature control mechanisms. In some variations, a cold brew device may be designed to be stored in a refrigerator to provide the temperature regulation. In a tea maker embodiment, parameters such as tea type, filter size, water temperature, brewing temperature, tea-to-water ratio, dissolved solid value can be regulated to adapt the brewing of tea to a predefined steeping process and/or user taste-profile.

2. System

Figure 1:
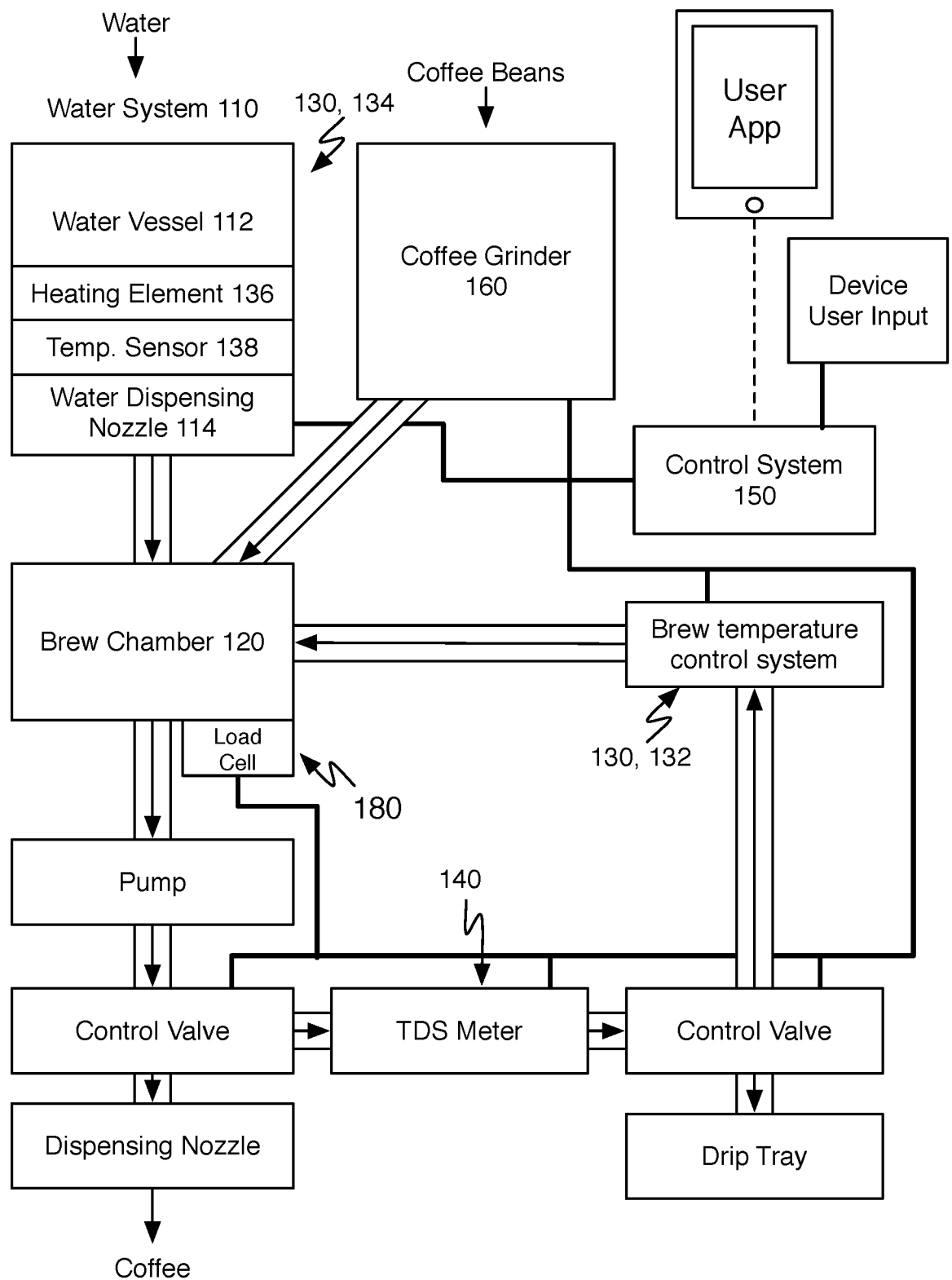
FIG. 1 is a schematic representation of a system of a preferred embodiment.
Figure 2:
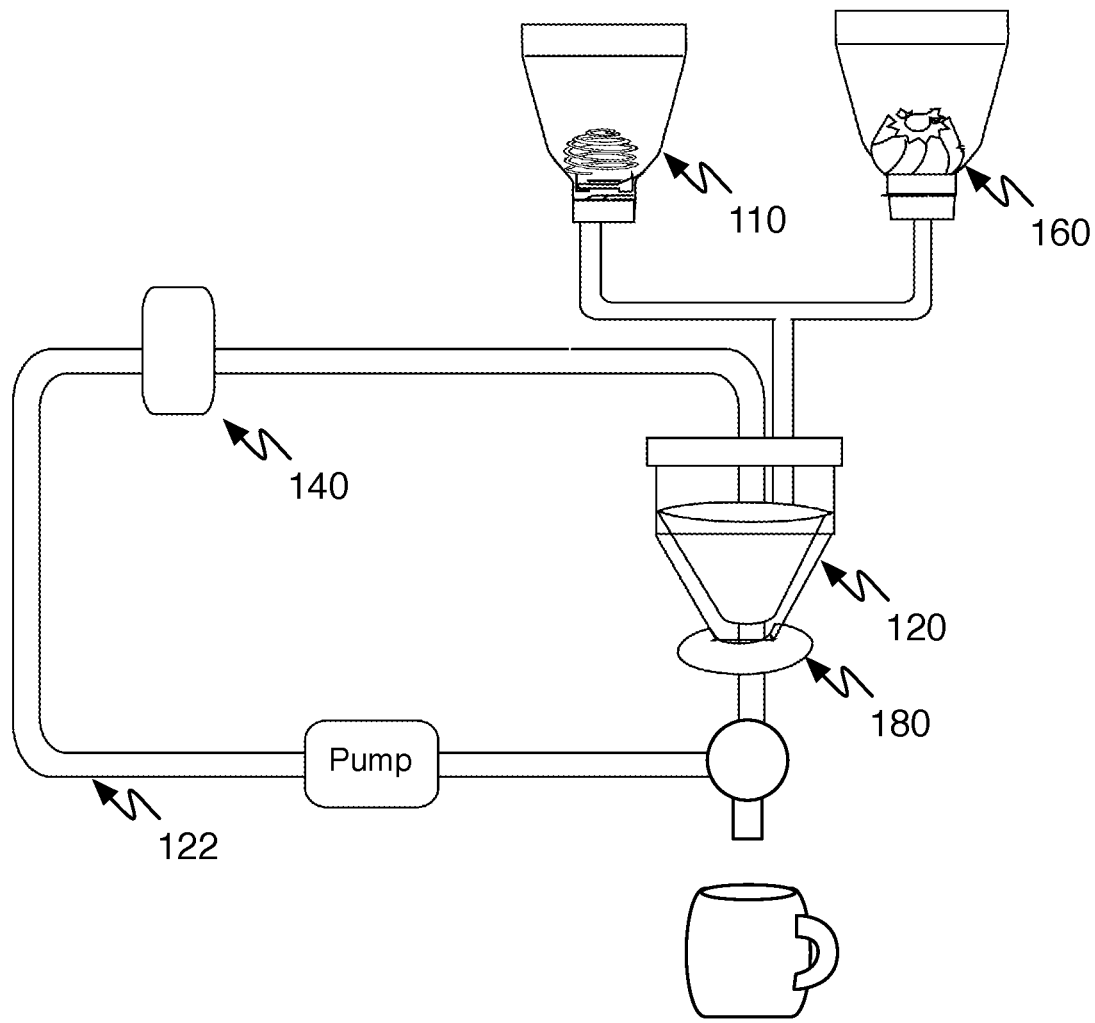
FIG. 2 is a schematic representation of the system addressing a subset of coffee brewing process variables.

As shown in FIG. 1, a system for controlling the brew process of a coffee maker of a preferred embodiment can include a water system 110, a brew chamber 120, a temperature control system 130, a particle monitor system 140, and a control system 150. The system may additionally include a grinder 160 and/or a coffee flight system 170. The system is preferably implemented as a single unit but may alternatively be a collection of multiple components that can be assembled, used independently, or used in cooperation. The system can preferably control at least a subset of the variables relating to grind size, filter size, water temperature, brewing temperature, coffee-to-water ratio, and/or dissolved solid value as shown in FIG. 2. Preferably, there is a system base 102 (i.e., coffee maker base) to which the various components attach.

Figure 3:
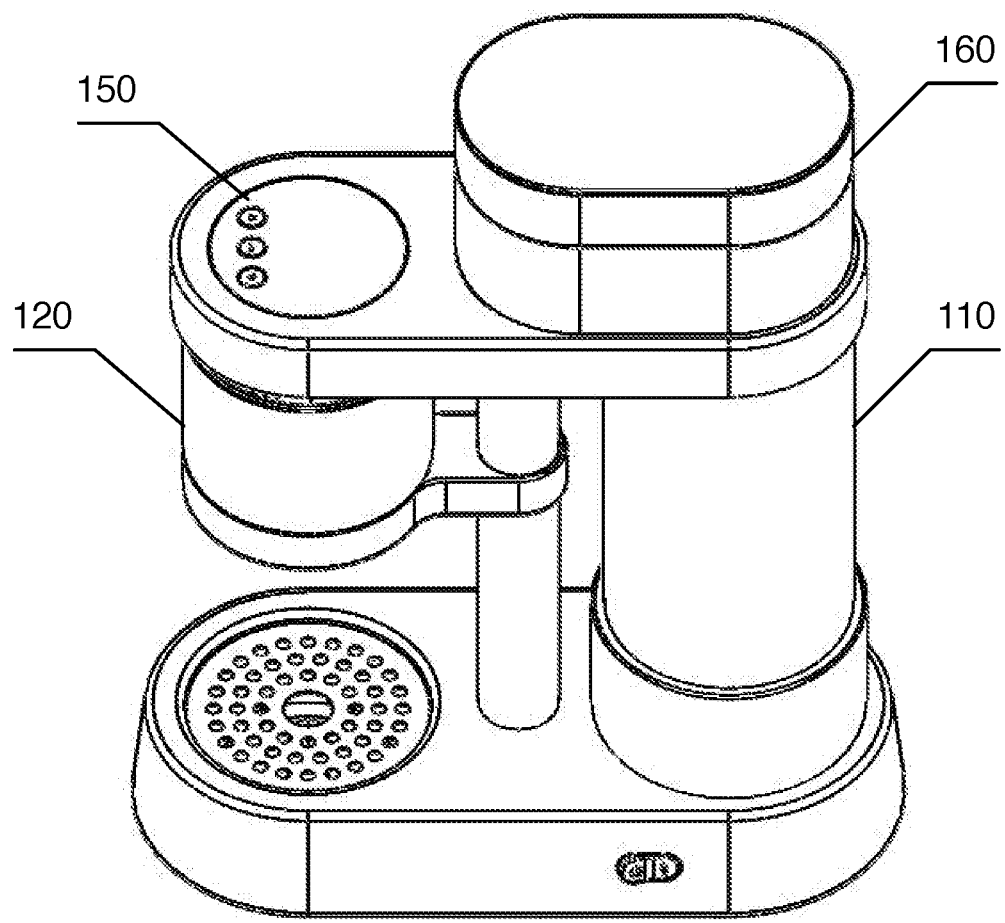
FIG. 3 is a schematic representation of an exemplary implementation of the system.

In one implementation, the water system 110, and the grinder 160 are positioned above the brew chamber 120 so that water and coffee grounds can be deposited into the brew chamber. A cup, carafe, or other receptacle for brewed coffee can be placed underneath the brew chamber 120 or in any suitable position where finished coffee can be deposited into the receptacle. While a gravity based system as described may be used, the system may alternatively use a pressurized system and/or mechanical mechanisms to transport coffee ingredients and product through the system, which may function to alter the footprint, dimensions, or form of the system. The system may use alternative form factors with integrated various subsystems to transport ingredients to different stages of coffee brewing. As shown in FIG. 3, the water system 110 may be positioned alongside the brew chamber 120 and a pump or some other mechanism can transport the water into the brew chamber 120.

The water system 110 of a preferred embodiment functions to dispense water into the brewing chamber. The water system preferably includes a water vessel 112 and a water dispensing nozzle 114. The water vessel 112 includes a defined reservoir that can hold water. Alternatively, water may be fed into the system through any suitable water delivery method such as hosing connected to a faucet. The water vessel 112 can include a lid but may alternatively be an open chamber. A user can add water to the water vessel 112 from any suitable source. In one implementation, the water vessel 112 can be removed from the system base 102, filled with water, and then reconnected to the system base 102. In another implementation, the water vessel 112 may have a defined inlet where water can be directly inserted from a faucet or poured from a pitcher. The water vessel 112 preferably includes a single outlet. However, in one alternative approach multiple outlets may be used for integrating with an alternative design with a water dispensing nozzle or for integrating with other subsystems such as a cleaning system, the coffee flight system 170, or for integrating with any suitable element. In one variation, a controllable valve can be integrated into the water system 110 to transition the water system between a holding mode and a dispensing mode. The controllable valve can be integrated into the water dispensing nozzle 114 to selectively dispense water. During the holding mode, water is held within the water vessel 112. The holding mode can additionally be used in setting the temperature of the water by heating the water with the heating element 136. During the dispensing mode, the water can be dispensed through the water dispensing nozzle 114. The water preferably dispenses the water into the brew chamber 120.

Figure 5:
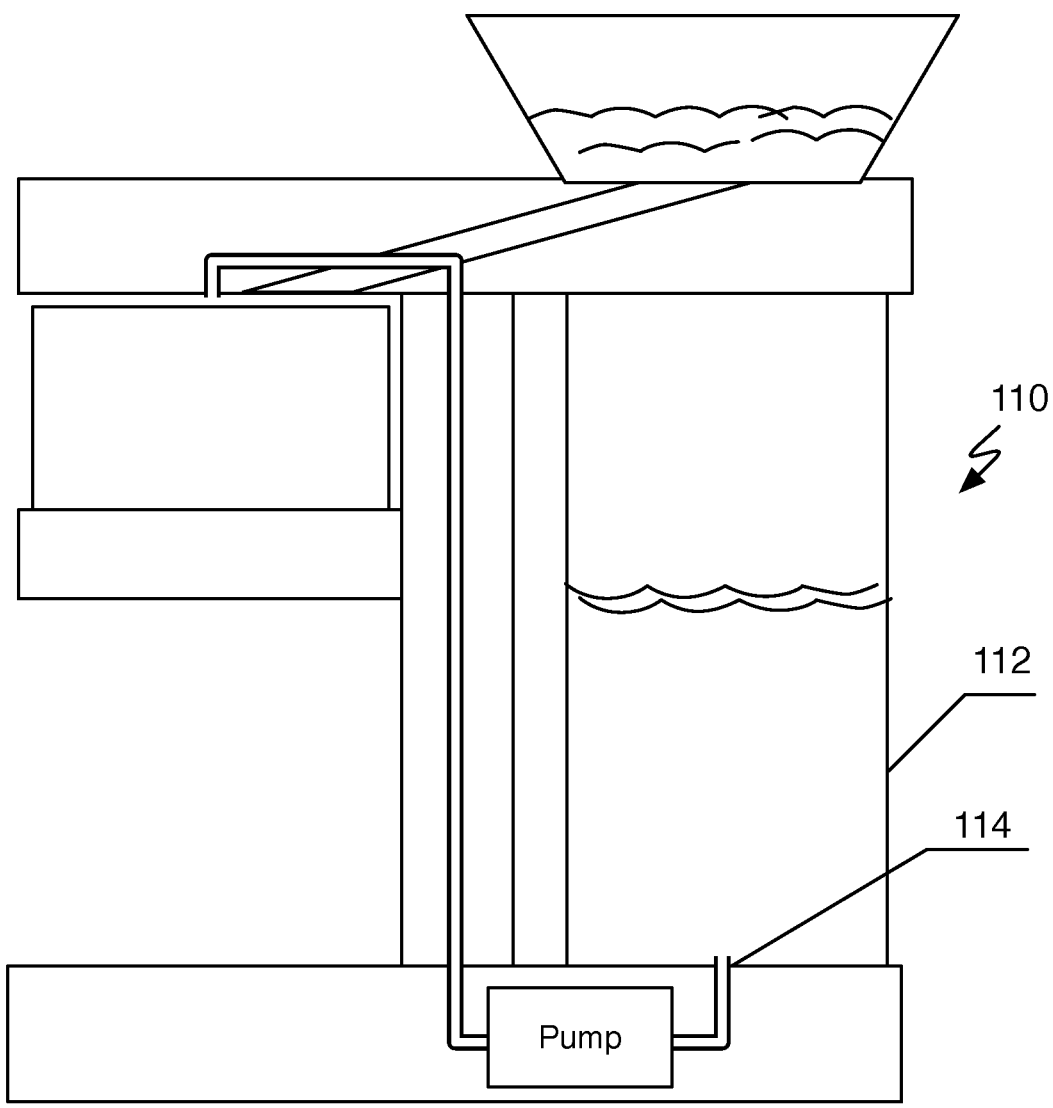
FIG. 5 is a schematic representation of a variation of a water system with a pump-driven water dispensing nozzle 114.

The water dispensing nozzle 114 functions to transfer water from the water system into the brew chamber 120. The water dispensing nozzle 114 is preferably a conduit for water to be transported from the water vessel 112 and dispensed into the brew chamber 120. The water dispensing nozzle 114 may be a controllable valve that can open or close to allow liquid to drain out of the water dispensing nozzle 114. The water dispensing nozzle 114 can alternatively transport the water and may include a tube, a channel, or other defined structure with a defined form that functions to transport the water. In one variation, the dispensed water can be pressurized and pumped through from the water vessel 110 to the brew chamber 120. As shown in FIG. 5, a pump-driven water dispensing nozzle 114 may transport water to a brew chamber from a water vessel 110 that holds the water at a level below that of the brew chamber 120. In another variation, the dispensed water may dispense through passive gravitational and atmospheric pressure acting on the water vessel 112. At one end, the water dispensing nozzle 114 is attached to an outlet of the water vessel 112. Alternatively, the outlet of the water vessel 112 can be positioned to dispense water into a conduit of the water dispensing nozzle 114.

Figure 8:
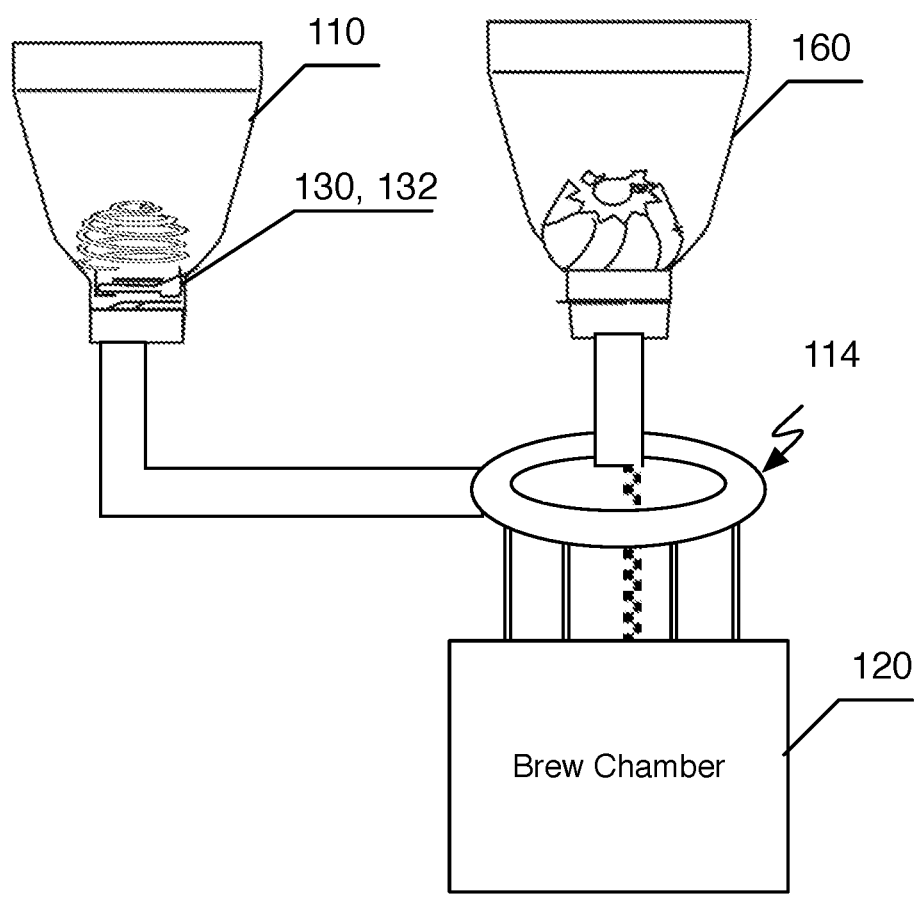
FIG. 8 is a detailed schematic representation of a water system and a grinder.

At an opposite end of the water dispensing nozzle, there is at least one dispensing outlet of the water dispensing nozzle 114 that is positioned to dispense liquid into the brew chamber 120. A dispensing outlet can be a defined hole through which water is dispensed. In one preferred implementation, the water dispensing nozzle 114 includes a set of dispensing outlets. The set of dispensing outlets can be in a defined pattern, which functions to shower water the surface of the brew chamber 120. In one shower configuration variation, the water dispensing nozzle 114 can include a ring shaped form with a set of dispensing outlets positioned along the path of the ring. The water dispensing nozzle 114 can include an open center, which can function to provide an opening through which coffee grounds may be dispensed into the brew chamber 120 as shown in FIG. 8.

The water system may additionally include a water filter. The water filter can be integrated with the water system no so as to filter water as it is added to the water vessel 112, as it leaves the water vessel 112, as it leaves the dispensing nozzle 114, or at any suitable point.

The brew chamber 120 of a preferred embodiment functions as a receptacle for coffee grounds and heated water. The active brewing process occurs substantially within the brew chamber 120. The brew chamber 120 can be a rigid structure affixed to the coffee maker base 102. The form of the brew chamber 120 preferably defines a first opening and a second opening. The first opening (i.e., a defined access opening) is preferably substantially larger than the second opening, and the water and coffee grounds are deposited into the brew chamber 120 through the first opening. The second opening (i.e., a dispensing outlet) is a defined hole or valve on the lower portion of the brew chamber 120 through which brewed coffee exits the brew chamber 120 (either for particle monitoring or for dispensing into a cup/carafe). The brew chamber 120 preferably defines a substantially cylindrical cavity. The cylindrical form may function to promote even extraction from the coffee grounds. The first opening defines an opening through which water and coffee grounds can be added. The second opening can be defined at an opposing end (e.g., along the bottom surface of the brew chamber 120, which functions as an outlet for the brew solution. In another variation, the brew chamber 120 is preferably tapered in form with the larger side of the taper form defining the first opening. The second opening can be defined at or near the tip of the tapered form (e.g., the bottom of the brew chamber 120 when in use). Alternatively, any suitable form may be used for the brew chamber 120. The brew chamber 120 may be made of multiple components. For example, a support structure may be fixed to a base coffee maker structure and a removable structure can be placed inside the support structure, which may function to promote easier cleaning of the brew chamber 120. The brew chamber 120 can additionally include a coffee filter or receive a coffee filter. A variety of coffee filters or a variable coffee filter system may be used which can be used as one of the control variables in brewing coffee. A brew chamber filter functions to filter the coffee grounds out of dispensed coffee.

In some variations, the system can include a content sensing system 180, which functions to measure at least a portion of the contents added to the brew chamber. The content sensing system 180 is preferably integrated with the brew chamber 120, but may alternatively or additionally be integrated into the water system 110, the grinder 160, or any suitable component. Preferably, the brew chamber 120 has an integrated load cell that measures the weight of the ingredients added to the brew chamber 120. The content sensing system 180 can measure a base weight of the brew chamber 120, then measures the weight of the added coffee grounds, and then measures the weight of the added water. The control system 150 is preferably connected to the content sensing system 180 so that the amount of water and/or coffee dispensed into the brew chamber 120 can be monitored and controlled. The content sensing system 180 may alternatively use alternative mechanisms for sensing content quantity such as using volumetric sensing, a vision system, or any suitable type of sensor. Alternatively, the water vessel may be able to determine the amount of water dispensed and/or the grinder 160 can determine the amount of coffee added to the brew chamber 120.

A temperature control system 130 functions to regulate and/or modify the temperature of one or more stages of the coffee making system. Temperature may have significant impact into the variability of brewed coffee. The system preferably has robust temperature sensing and control capabilities to manage its impact during a brew cycle. The temperature control system 130 may be set to consistently target one temperature such that temperature is constant while other variables are modified (e.g., brew time, grind size, coffee amount, etc.). Alternatively, the temperature control system 130 may target different temperatures during a brew cycle. The temperature control system 130 preferably include a heating element 136 and a temperature sensor 138. The temperature control system 130 can be integrated in a variety of ways. Preferably, the temperature control system 130 can control at least the temperature of water dispensed from the water system 110 and the brew solution in the brew chamber 120. Accordingly, the system can include a water temperature control system 132 and/or a brew temperature control system 134. Some variations described herein can achieve water and brew temperature control using a single temperature control system through direct and indirect heating. Additionally, temperature of other components could similarly be controlled. For example, the system could include a carafe temperature control system that preheats the carafe before coffee is dispensed and that maintains a set temperature while the coffee is held.

The heating element 136 functions to heat the water, brew solution or other element to a defined temperature range. The temperature range is preferably determined based on a brew process configuration for each instance of brewing. The heating element 136 is preferably an electric heating element that can be actively controlled. Alternative forms of heating elements may alternatively be used such as a gas heating system, a solar heating system, or any suitable type of heating system. A temperature sensor 138 can monitor the temperature and communicate current temperature data to the control system 150. The control system 150 is communicatively coupled to the heating element 136 and the temperature sensor 138 to dynamically adjust the heating state. Preferably, water in the water vessel 112 and/or brew solution in the brew container 120 can be heated to a defined temperature range and then held substantially stable. Alternatively, a heating sequence can heat the water with a variable temperature over time, which may be used in altering the temperature of the water dispensed into the brew chamber. In one variation, the thermal coupling of the water system and the brew solution can be leveraged so that a single heating element 136 can be used to control water and brew solution simultaneously. In one preferred implementation, the heating system directly heats liquid in the water system 110, and a processing loop 122 connected to the brew chamber 120 circulates the brew solution through a subsection of the processing loop 122 that is thermally coupled to the water system. The heating element is then able to indirectly heat the brew solution as it is circulated through the processing loop 122.

Figure 6:
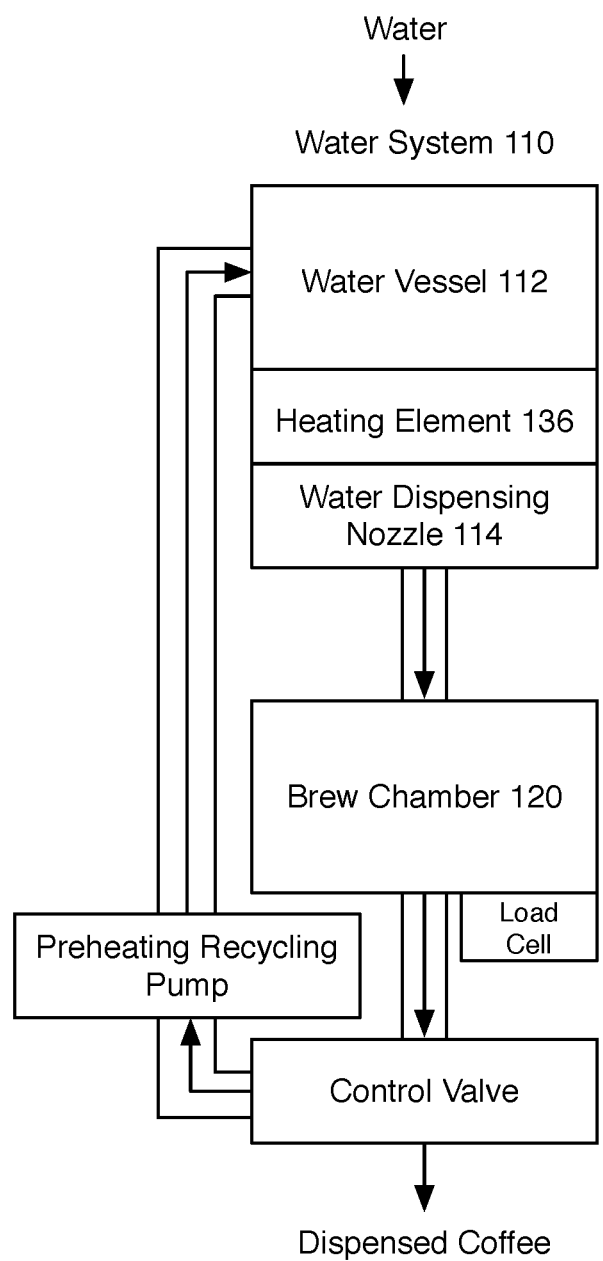
FIG. 6 is a schematic representation of a variation of a system with a recycling preheating system.

The temperature control system 130 can be used in pre-heating various components. In one variation, the temperature control system 130 includes a recycling preheating system, where preheated liquid is cycled through at least two components and then returned to the water system where it can be reheated and dispensed into the brew chamber. As shown in FIG. 6, a liquid recycling line can pump water from the brew chamber 120 into the water system 110. Water could be preheated, dispensed into an empty brew chamber 120, and pumped back into the water system. In another variation, the preheated liquid can be dispensed from the water system 110, into am empty brew chamber 120, and then dispensed into a carafe, and then finally pumped back to the water system. The recycling preheating system functions to reduce water waste and energy waste while also being able to preheat and prepare coffee in potentially shorter amounts of time.

Figure 7:
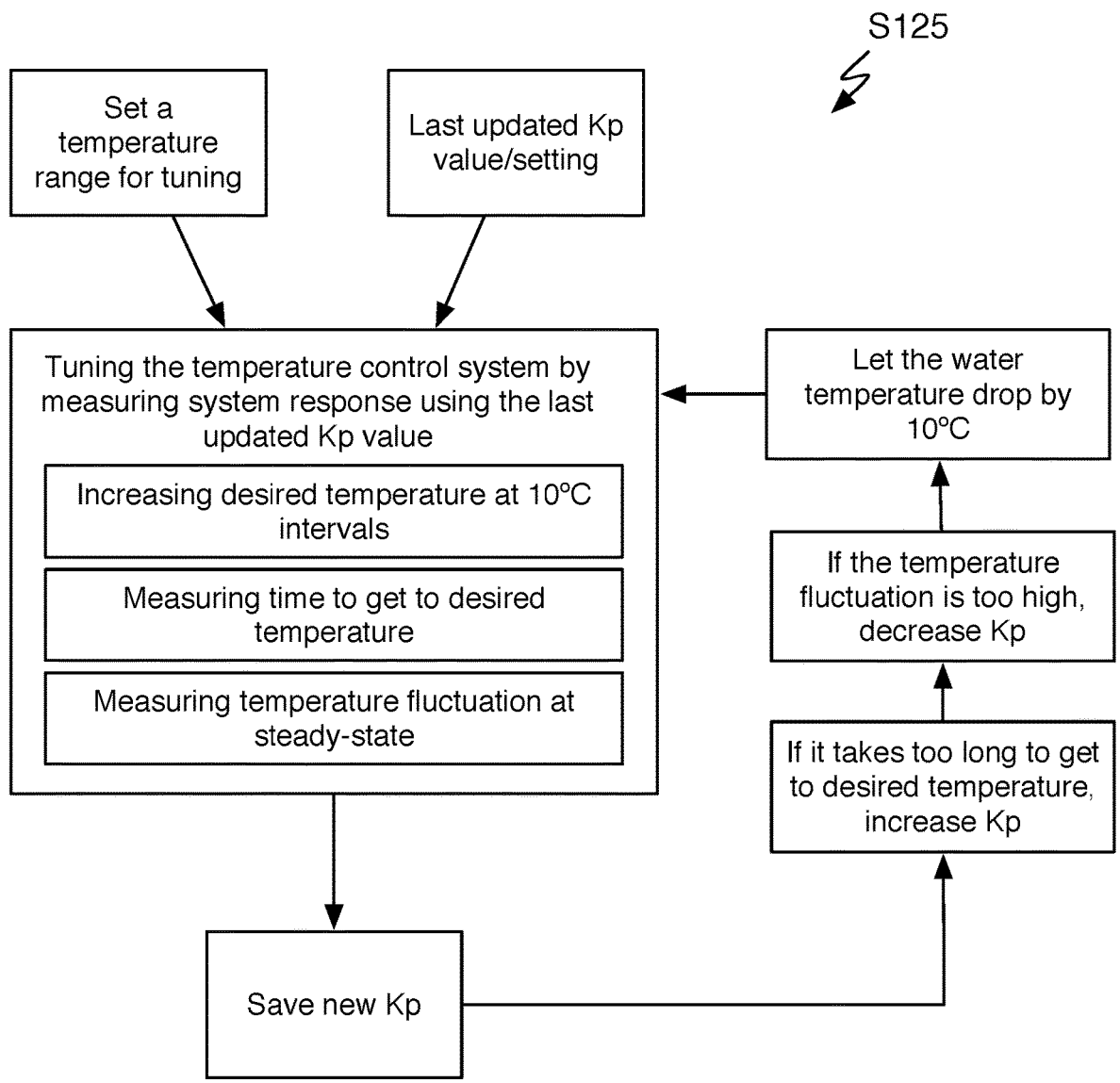
FIG. 7, is a flowchart representation of an exemplary implementation of calibrating the temperature control system.

The system, or more specifically the control system 150, could additionally include a calibration mode for the temperature control system 130, which functions to enable the system to account for variability of the impact of the heating element when directing control of the temperature control system 130. Elevation, humidity, water quality, ambient temperature, and/or other factors could alter the performance of the temperature control system 130. The calibration mode may execute when being setup, but is preferably performed periodically. In one implementation of the calibration mode, the temperature control system cycles through various temperature changes—setting a new target temperature, measuring the time to heat water to a desired temperature, and measuring the temperature fluctuation at steady-state. Calibration settings can be set based on these and/or other measurements and used when heating components of the system as shown in FIG. 7.

The calibration settings of a particular coffee maker may be synchronized with a remote coffee platform along with geographic information of the coffee maker. For example, the GPS position of a user application communicating with the coffee maker may communicate calibration settings of the coffee maker to a remote server accessible by multiple coffee maker systems. In a system comprising multiple coffee maker systems, a subset of the coffee maker systems may be made without sensors or at least temperature sensing capabilities. The geographic location of such sensorless systems could utilize the calibration settings of systems with sensors in determining how to control a heating element.

The brew temperature control system 134 of a preferred embodiment functions to regulate the temperature of the brew process. The brewing process of the system can be configured for a variety of brewing techniques including decoction, infusion, filtration, or pressurized percolation. Herein, filtration is used as the exemplary brewing process, but one skilled in the art would appreciate how other the system could be applied to other brewing techniques. In one variation, a second heating element and temperature sensor can be used to regulate the temperature of the brewing solution, while a first heating element and temperature sensor are used within the water system no. Alternative, the heating system and temperature monitoring system of the water system no and brew temperature control system 134 may be shared or at least partially integrated as described herein.

In one preferred variation, the system includes at least one brew processing loop 122. The brew processing loop 122 is preferably a recirculating path for the brew solution, wherein a portion of the brewing solution can be extracted from the brew container 120 so as to pass through different processing steps as shown in FIG. 1. The processing loop 122 includes a pump and a length of tubing wherein brewing solution is pumped from the brew chamber 120 through at least one processing stage and back into the brewing chamber. The brew temperature control system 134 can be integrated as one of the processing stages in the processing loop. Additionally or alternatively, the processing loop 122 can include a particle monitoring stage. Processing stages can be arranged in series or in parallel within a processing loop 122. In some variations, multiple processing loops 126 may be used with different processing stages. In an alternative implementation of the processing loop, the extracted brew solution is not recirculated but is extracted, processed, and then dispensed out a waste outlet.

Figure 9:
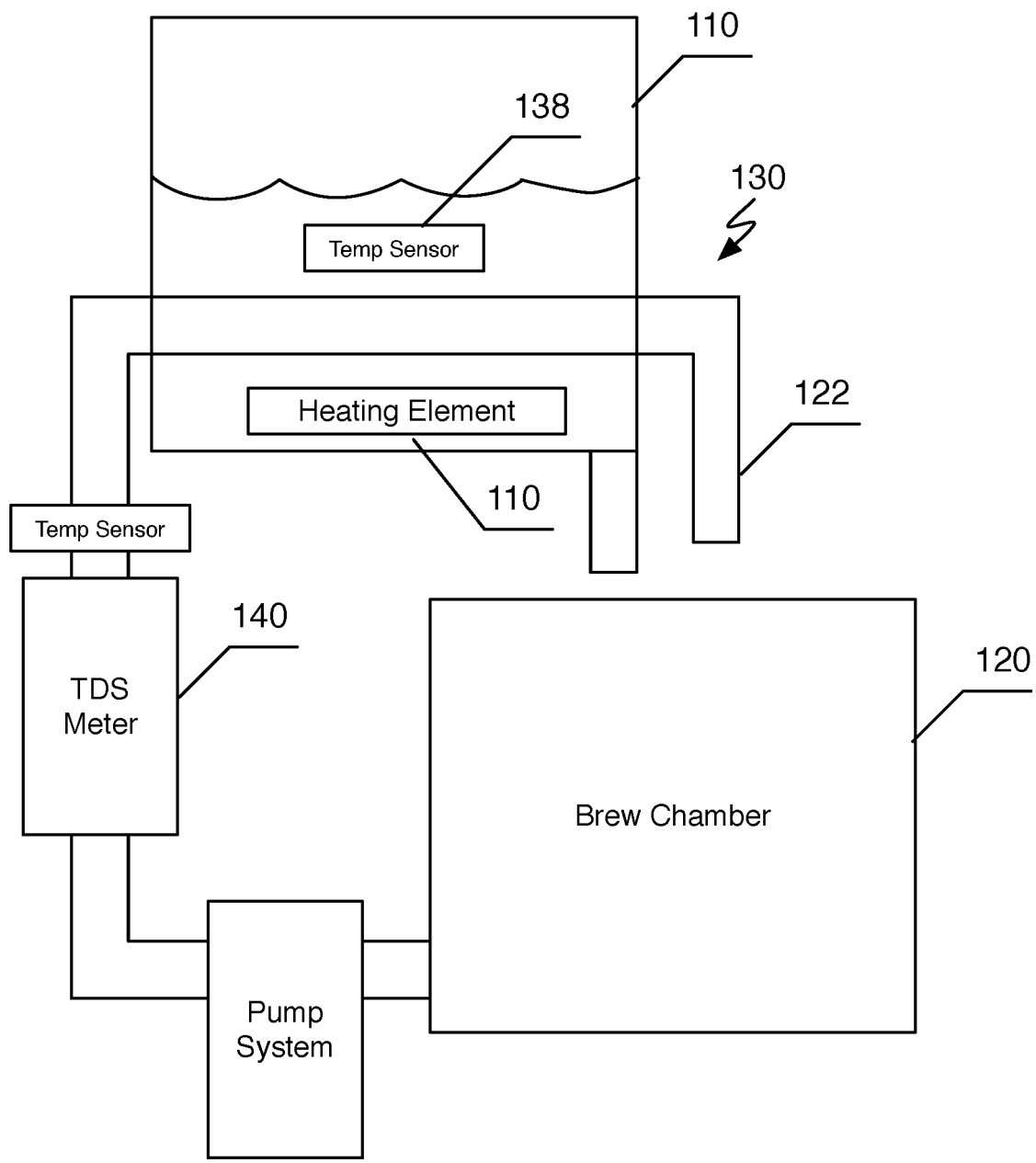
FIG. 9 is a detailed schematic representation of a configuration that shares the heating element between the water system and the brew temperature control system.

In one variation with the brew processing loop 122, the brew temperature control system 134 can be integrated with the water system 110, wherein the heating system of the water system 110 is used to augment and regulate the temperature of the brewing solution. In the brew processing loop 122, a pumping system preferably cycles the brewing solution from the brew chamber 120, through a tube that is thermally coupled to the heated water system no, and back into the brew chamber 120 as shown in FIG. 9. The applied heat of the heating element in the water system no preferably transfers to the brewing solution and the water, and the brewing solution in the brew chamber 120 can be maintained at substantially the same temperature as the water. In a one variation, the brew temperature control system 134 includes a segment of a tubing loop wherein the tube is substantially surrounded by water of the water vessel 112. In this variation, the thermal coupling is along the length of the segment of tube on all sides. In another variation, the segment of tube runs along one surface of the water vessel 144 such as the bottom surface. In this variation, the thermal coupling is along the intermediary surface(s) separating the tube segment and the water in the water vessel 112.

A similar approach may utilize a shared heating system without a brew processing loop. For example, the water vessel no and the brew chamber 120 may be designed to be thermally coupled along one surface. In one variation, the water vessel 110 may share one surface with the brew chamber 120. In another variation, the water vessel 110 may surround the brew chamber 120. Alternatively, the brew chamber 120 can include an internal chamber for the water vessel no, such that the brew chamber 120 surrounds the water vessel 110. In such variations, pumping system can be used to transfer the water into the brew chamber 120 as discussed above. Any suitable heating and temperature regulation system may alternatively be used.

The particle monitor 140 of a preferred embodiment functions to measure the value of dissolved coffee particles in the brew solution. The particle monitor 140 preferably includes a total dissolved solids (TDS) meter that is used to measure the measure of dissolved coffee particles in the brewing solution. The particle monitor 140 is preferably connected to the control system 150. In addition to or as an alternative to using time-based estimations of when the coffee has sufficiently brewed, the total dissolved solids value can be used to know when the brewing process has completed. A measurement of dissolved solids preferably includes measuring conductive properties of brew solution. Alternatively, capacitance, inductance, light refraction, and/or other properties may be used. In the conductance variation, the TDS meter can include two electrodes. The TDS measures conductivity of the solution, which is correlated with a dissolved solid value. The temperature of the measured brew solution can additionally be measured which can be used in combination with the conductance measurement to produce a dissolved solid value. In some variations of the particle monitor 140, the temperature of the brew solution may alter measurement readings. A temperature sensor can be positioned within close proximity before or after the TDS meter. The temperature sensor used by the particle monitor 140 may be distinct or shared with the water system no and/or brew temperature control system 134. Preferably, the brewing solution is filtered and then passed through an interrogation area of the TDS meter within a processing loop 122. Preferably, the electrodes are positioned along an axis perpendicular to the path of the brew solution, which can result in faster measurements of the TDS value.

The particle monitor system can be integrated with the brew temperature control system 134 such that within a brew processing loop 122, the particle monitor 140 and the temperature control portion are two processing stages acting in series on brewing solution. In another variation, there can be two distinct brew processing loops 126, one for regulating temperature and one for measuring the dissolved particle value.

In one exemplary implementation of a brew processing loop 122, the system can include a brew selection valve, which can be used to divert a brew solution into a processing loop or to a dispensing nozzle. Alternatively, two distinct valves in the brew chamber 120 may be used. Preferably, the brew selection valve diverts the brew solution into a processing loop 122 (i.e., the brew selection valve is in a processing loop mode) while the brewing solution is brewing. The brew solution can be left to brew until a brewing condition is satisfied. The brewing condition can be based on dissolved solid value, time, temperature, water-to-coffee ratio, and/or any suitable property. When the brewing condition is satisfied, the brew selection valve transitions to a dispensing mode and diverts the brewing solution out of the brew chamber 120 to be dispensed in a receptacle. In a two valve variation, a processing loop valve is open and a dispensing valve is closed when brewing. Similarly, the processing loop valve is closed and a dispensing valve opens when the brewing condition is satisfied. A pumping system can be used in place of or in addition to a processing loop valve. The pumping system of the processing loop 122 preferably activates to move brew solution through the processing loop 122 when brewing, and deactivates to end circulation when dispensing.

The system can additionally include a cleaning system, which can function to automatically clean all or a portion of the system. The cleaning system preferably cleans the processing loop 122, which may be sealed and less accessible for cleaning. The cleaning system can include an operational mode wherein water is flushed through the system. A flush valve can be positioned after the particle monitor 140. When in a cleaning mode, the flush valve diverts water to a drip tray as shown in FIG. 1.

Figure 10:
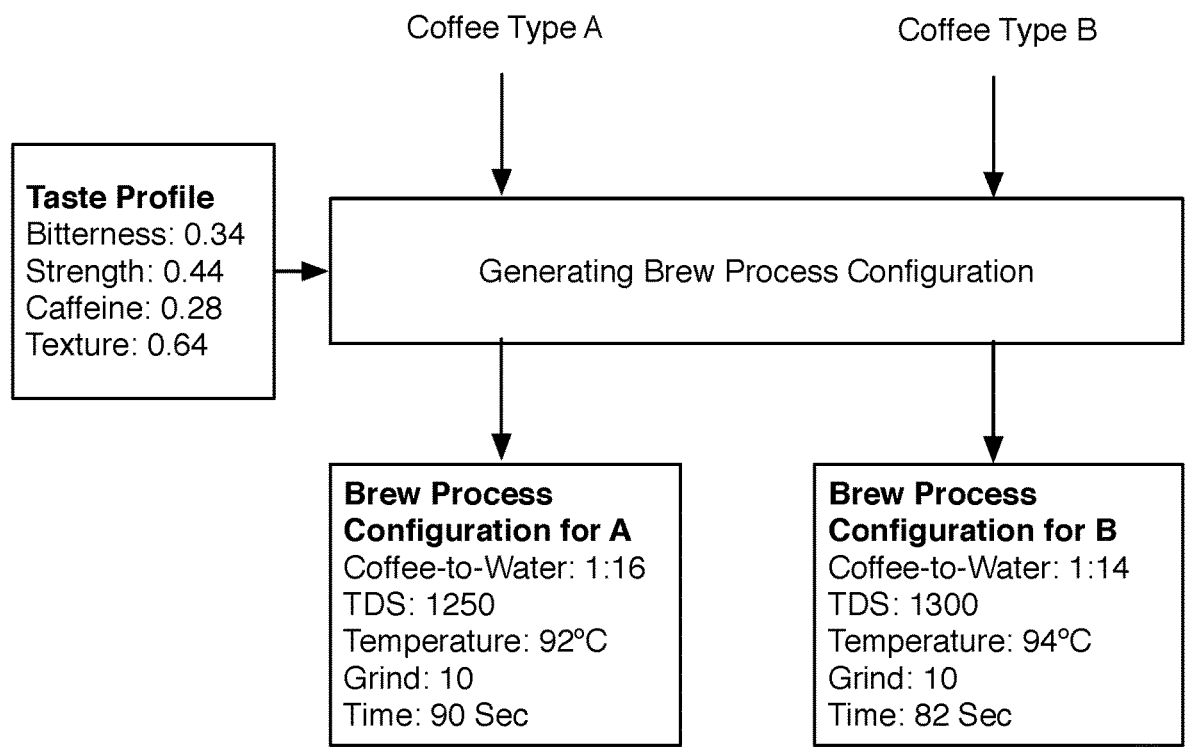
FIG. 10 is a schematic representation of a taste profile used to generate a brew process configuration.

The control system 150 of a preferred embodiment functions to operate the system. The control system 150 can include an on-device computing unit and any suitable components used to drive the system such as a power supply system, communication elements (e.g., Wi-Fi module, Bluetooth module, etc.), user interface components, and/or any suitable elements. The control system 150 is preferably in communication with the various sensing elements and the active components such as the temperature control system 130, the particle monitor system 140, and the content sensing system 180. The control system 150 can additionally be communicatively coupled to other components such as controllable valves, pumps, sensors, actuators, and/or other components of the system. The control system 150 can monitor sensed values and control the active components to augment the brewing process. The control system 150 is preferably configured with a brew process configuration that may be based on a target taste profile prior to executing a particular brew cycle (i.e., preparing a portion of coffee). The configuration can be altered between different coffee preparations. The brew process configuration used during a brew cycle can direct the water to coffee grind ratio, the temperature, the target dissolved solid measurement, and/or other controllable aspects. A taste profile of a user preferably characterizes the unique preferences of a user. The taste profile can include preference history across multiple brew cycles. The taste profile can be used to generate a brew process configuration for different conditions as shown in FIG. 10. Alternatively, a taste profile may directly specify a brew process configuration (i.e., the taste profile of a user could be a brew process configuration). An individual coffee maker may have a single stored taste profile based on the history of the machine. Alternatively, a taste profile can be selected from a set of taste profiles with each taste profile associated with a distinct user. For example, a first target taste profile can be used when making a first cup of coffee for a first user, and a different target taste profile can be used when making a second cup of coffee for a second user. With regard to the coffee flight system 170, multiple brewing processes can be conducted for a single configuration.

The user interface components may include various buttons, switches, dials, capacitive buttons, or other suitable input elements. The user interface components may additionally or alternatively include a touch screen, a display, indicator lights, a speaker, or any suitable components used in interacting with a user.

In one preferred implementation the control system 150 can be controlled in part by a remote application. The remote application can be a native application on a mobile computing device such as a smart phone, a tablet, a wearable computing device, laptop computer, a TV computing device, or any suitable computing device. The remote application may alternatively be a web-based application accessible over an internet connected device.

The user interface components and/or the remote application can include a feedback user interface, wherein a user can rate coffee made by the system. User feedback is preferably collected for a coffee dispensed made with particular configurations. The user feedback is then used to update a user taste profile, which can be used to recommend a coffee brewing process, automatically adjust a brewing process to accommodate user preferences, and/or otherwise augment the brew process configuration during a future brew cycle of the system.

The user interface of the control system 150 may offer user options and interactions for basic control of the system, for scheduling or remotely starting a brewing process, for coffee feedback, for a tasting flight mode, interacting with other coffee drinkers.

The user interface can preferably be used to set basic control options. In one variation, a user may specify the type of coffee beans and then indicate when to start the brewing process. In one variation, user feedback and/or the taste profile can be used in combination with the selected bean type to determine a brew process configuration used by the control system during a future brew cycle. For example, a user may enter the type of beans they are using. Then the user's taste profile is used to determine how to brew that bean type using preloaded information on the bean. Alternatively, the user may be able to specify a taste profile or alter the taste profile for a specific brew cycle. For example, the user may decide to increase the caffeine strength because they extra sleepy. Other options that could be set with the basic controls can include the amount of coffee and/or any suitable variable. A user may be able to schedule when serving of coffee should be brewed based on time, location, or other detectable events.

Figure 11:
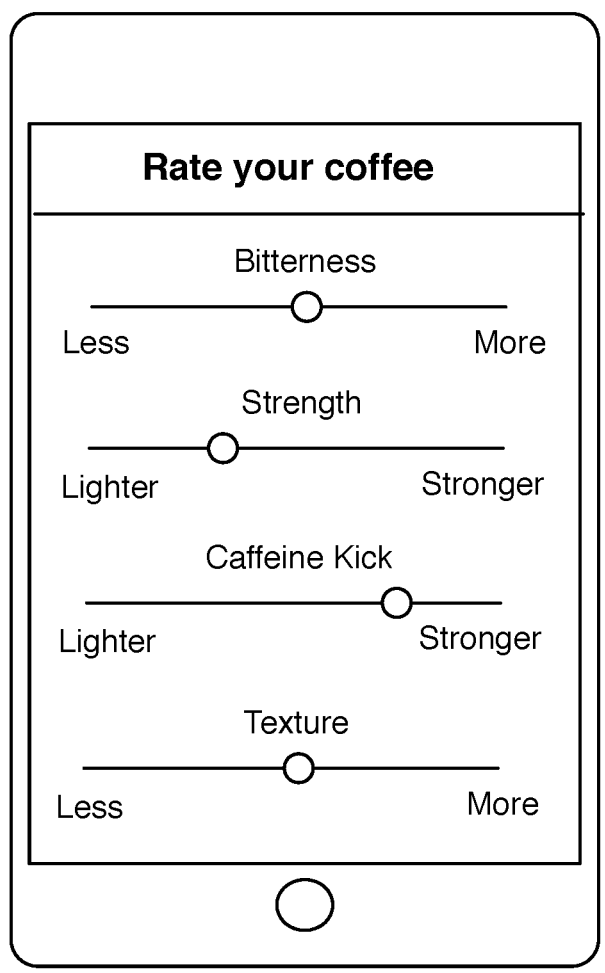
FIG. 11 is an exemplary screenshot representation of a user application collecting user feedback on dispensed coffee.

The user interface can additionally be used in collecting feedback from a user. A user can indicate the impressions of the user after drinking the brewed coffee. The form of feedback could be star reviews, rating various properties of the coffee, or any suitable format of feedback. In one implementation, a review can be collected after a user has experienced a particular serving of coffee. As shown in FIG. 11, the user interface may collect a rating on various aspects of the coffee such as bitterness, strength, caffeine kick, and texture.

The user interface may additionally be used in controlling other options of the system such as a tasting flight system 170. The tasting flight system can enable multiple servings of coffee to be made to different specifications. The user interface may enable a user or multiple users to set the targeted taste profile for different drinks to be made with the tasting flight system 170. In one use case, the tasting flight system 170 is designed for experiencing different styles of coffee. A user may specify the types of coffee to use in the tasting flight. Alternatively, the types and preparation of the coffee grounds may be specified by the user interface and the user can follow the loading instructions. In another use case, the tasting flight system 170 is used to make individual servings for multiple users. The taste profile for each serving could be customized through the user interface. In one option, a single user may explicitly set the taste profile. In another option, a taste profile may exist for multiple people, and thus someone controlling the system may simply specify the correct user profile to automatically use the associated taste profile. In yet another option, multiple users may connect to the control system 150 and place their individual preferences for their serving of coffee.

The user interface and application used to direct the control system 150 can additionally utilize various social features. The usage of the system, the user feedback, and other collected data can be communicated to a remote server of a coffee maker platform. With multiple instances of the system communicating data to the coffee maker platform, group analytics and other refinements can be used to enhance the taste profiles of multiple users. For example, recommendations and taste profile adjustments may be made based on feedback from other similar users. Similar users may be users that have similar feedback responses to similar or the same type of coffee. Similar users could also include users with a similar coffee drinking history (e.g., enjoys exploring new flavors or likes a singular taste), in the same geographic region, within a similar demographic classification, and/or sharing any suitable classification. The collective data from multiple users could also be used in providing unique features to the system. For example, the system could perform taste profile blending. Wherein the individual taste profile preferences of multiple users could be combined to form a group taste profile. The group profile may weight users evenly or bias towards one or more users. Similarly, the group taste profile may generate a taste profile that is the median or average taste profile from the set of individual taste profiles. In one variation, such user associated preferences could be tied to outside systems to identify the target audience of the brewed coffee. For example, in an office setting, the coffee maker system could be set to use a calendar schedule of a conference room and the associated attendees to automatically brew coffee. In this way, the office coffee maker system could make coffee that accounts for the individual taste flavors of the attendees of particular meetings.

In one variation, the system can enable a person to grind their coffee with their own grinder or to even use pre-ground coffee. One potential benefit of the system is that a user can select beans from any vendor. The bean origin, roasting style, and grinding technique can all be variables in the brewing process. The system may additionally include a grinder 160 which can function to control the grinding of coffee beans. The grinder 160 is preferably an electric burr grinder that is communicatively coupled to the control system 160. The grinder 160 can include a grind outlet positioned to deliver coffee grounds to the brew chamber 120, wherein the grind size and quantity of produced coffee grounds is controlled by the control system The grinder 160 can have controllable grinding time and/or grinding size. The grinder 160 deposits the ground coffee into the brew chamber 120. The grinder 160 may be made removable so that it can be used as a standalone grinder or mechanically coupled to the base of the coffee maker. In one variation, the grinder 160 when coupled to the coffee maker has an outlet coupled to a chute through which coffee grounds are ejected into the brew chamber 120. In another variation, the grinder 160 is mechanically coupled so that coffee grounds fall into the brew chamber 120. The amount of coffee grounds may be controlled through the grinder 160. The time of grinding (in combination with grind size) may be used to predict the quantity of coffee grounds deposited. Alternatively, a load cell integrated into the brew chamber 120 and/or the grinder 160 can be used to measure coffee grounds.

The system may include an additional coffee flight system 170 which functions to enable the preparation of multiple different "flights" of coffee. Preferably, the flight system 170 is an optional component (e.g., an "add-on" component) that can be removably connected to a brew chamber so that the system can be used for a single brew or for multiple brews depending on the configuration of the system. The control system 150 preferably operates in a flight mode when the flight system 170 is used. Alternatively, the flight system 170 may be permanently integrated into the system such that the system operates in flight mode continuously. Flight mode is an operating mode of the system wherein distinct brew configurations are made using segregated portions of the brew chamber 120. A flight mode of the system can be used in tasting various coffee variations side by side. For example, a user may want to experiment with a selection of different coffee bean roast types. Three different cups of coffee can be prepared through the system in flight mode and then tried side-by-side. Another exemplary use would be a couple wanting to have individually customized cups brewed when they wake up. While the flight mode, can be used to make different cups of coffee, the flight mode may include making at least two of the set of brew configurations substantially the same. A remote application may include a flight feedback mode wherein the user can provide user feedback through comparing the different cups. The flight mode may alternatively be used in a coffee shop where individual cup orders may come in and need to be prepared in rapid succession.

The coffee flight system 170 preferably includes a chamber divider 172, a flight water dispensing nozzle 174, and a chamber selection system 176.

Figure 12:
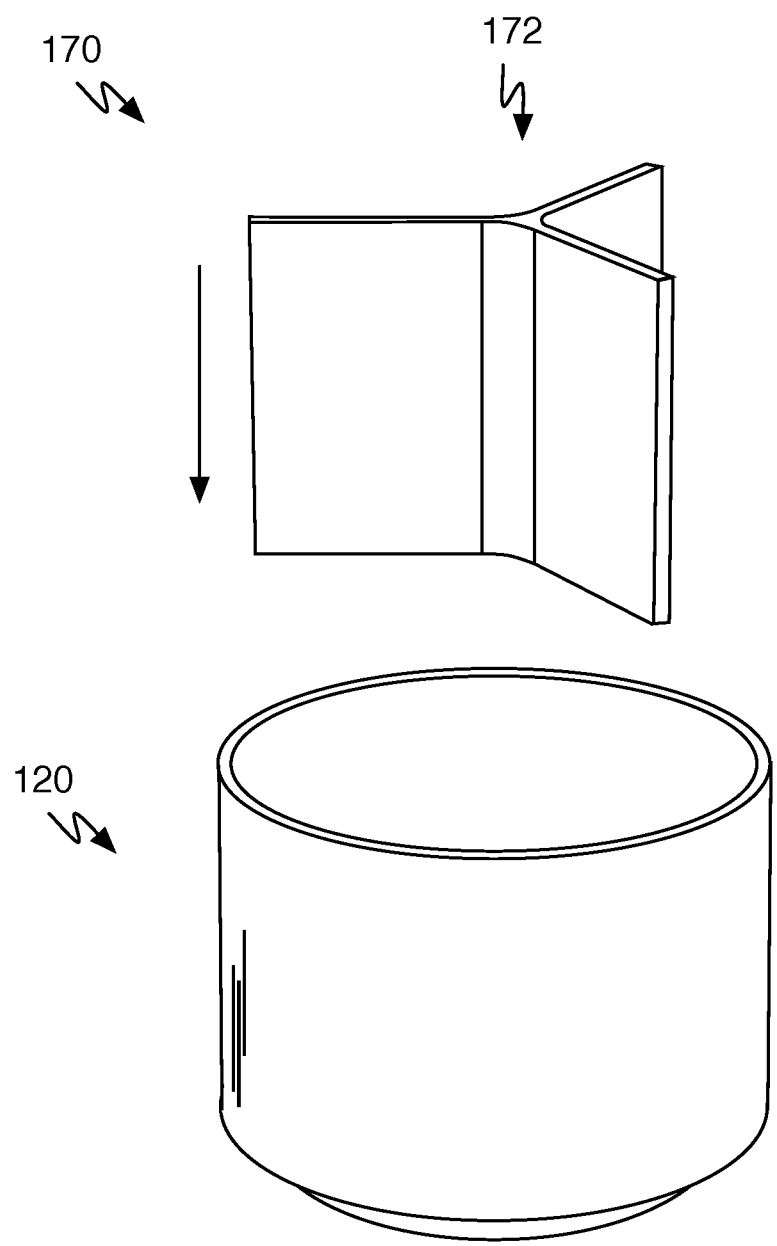
FIG. 12 is a schematic representation of a removable chamber divider.
Figure 13:
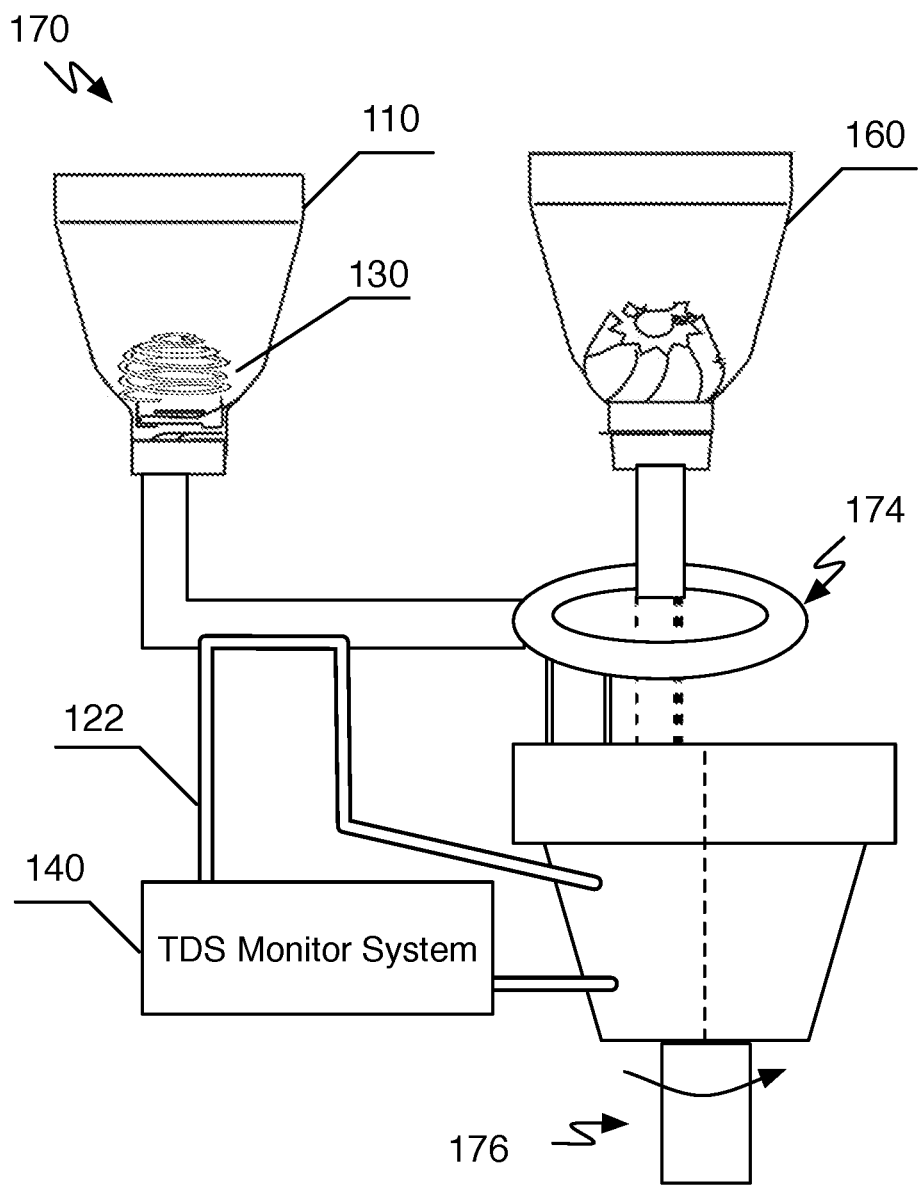
FIG. 13 is a detailed schematic representation of a coffee flight system.
Figure 14A:
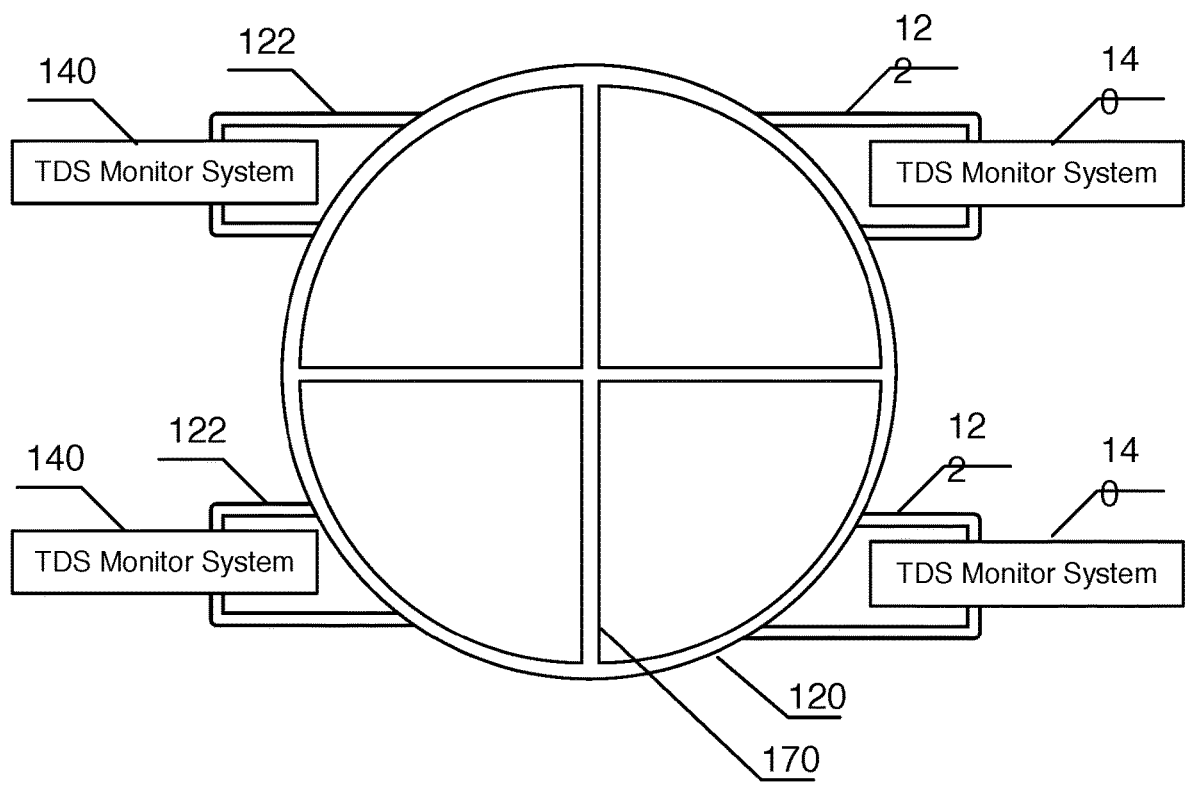
FIGS. 14A and 14B are schematic representations of variations of a system for a flight system.
Figure 14B:
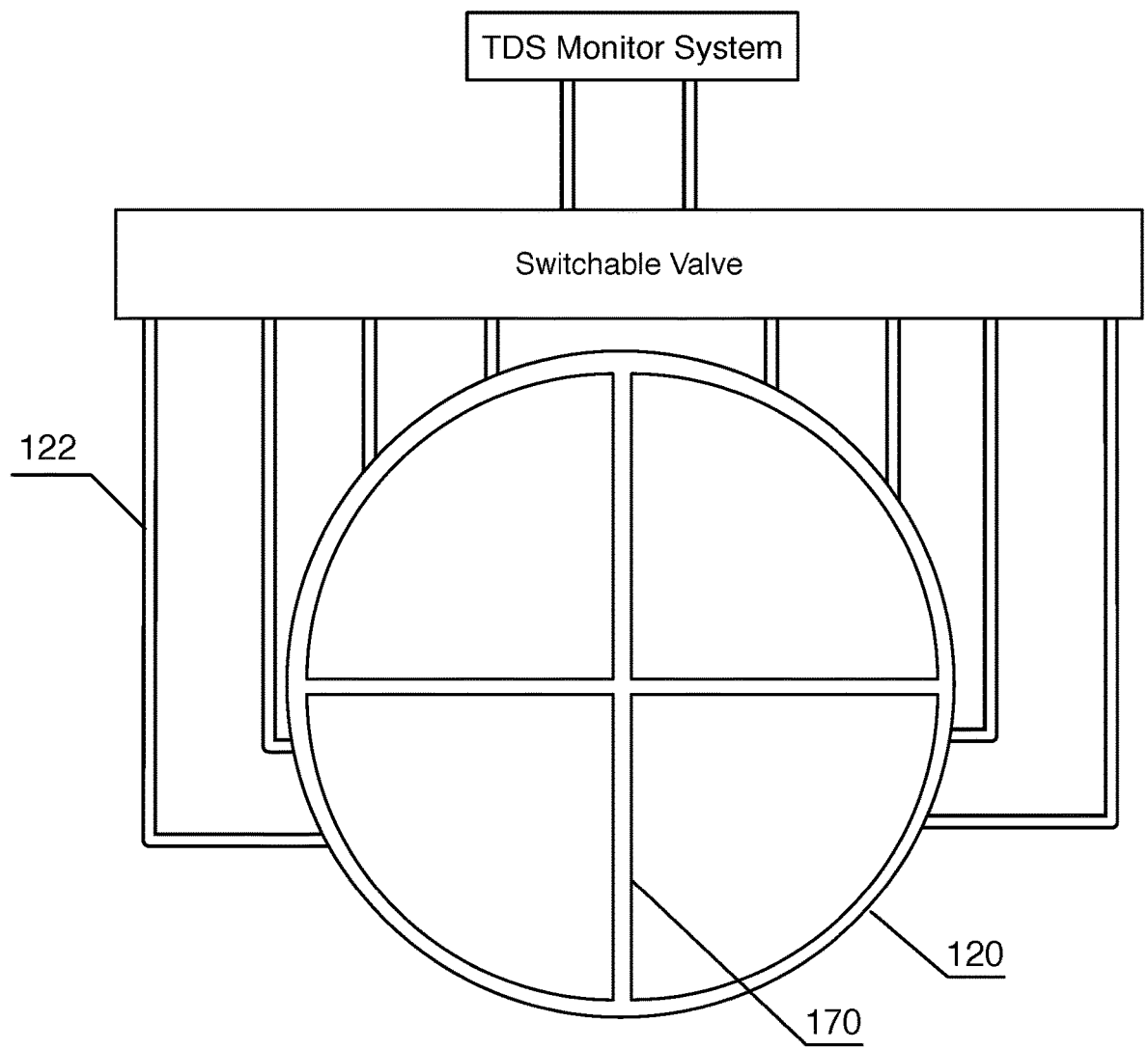

The chamber divider 172 functions to divide or segment the brew chamber 120 into a set of sub-chambers. Preferably the chamber divider 172 divides the brew chamber 120 into three sub-chambers, but any suitable number of sub-chambers may be used. In one variation, the chamber divider 172 is a removable structure that fits within the defined cavity of the brew chamber 120 as shown in FIG. 12. The chamber divider 172 and/or the brew chamber 120 can include structural members to fixture the chamber divider 172 into a position and optionally seal each sub-chamber from the other sub-chambers. The system may come with a set of interchangeable chamber dividers 172 such that the brew chamber 120 can be divided into two, three, four, or more sub-chambers depending on the inserted chamber divider 172. For each of the sub-chambers, a customized brewing process can be executed. Preferably, the water dispensing nozzle 114, the optional grinder 160, and the processing loop 122 can be configured to dispense/extract contents into a select sub-chamber. In one variation, the brew chamber 120 includes a single processing loop that is selectively moved into position for each sub-chamber as shown in FIG. 13. In another variation the brew chamber 120 can include a processing loop 122 for each sub-chamber as shown in FIG. 14A. In another variation, processing loops 122 for each sub-chamber can be selectively engaged for processing as shown in FIG. 14B.

The chamber selection system 176 is preferably a mechanical system wherein the selected sub-chamber can be changed. A selected sub-chamber is one of the sub-chambers that can have at least a portion of the brew cycle executed. So for example, selecting a sub-chamber may select that sub-chamber for receiving dispensed coffee grounds, receiving heated water, having a portion of its brew solution cycled through a processing loop, completed brew solution dispensed, and/or otherwise acted on. The chamber selection system 176 may rotate or reposition inlets and outlets to different sub-chambers. The chamber selection system 176 may alternatively rotate the brew chamber or the chamber divider 172 so as to reposition the sub-chambers as shown in FIG. 13. In one variation, the brew chamber 120 rotates about central axis. In another variation, the brew chamber 120 rotates about a non-central axis (e.g., an axis outside of the brew chamber 120). Additionally, the flight water dispensing nozzle 174 and the grinder 160 deposit water and ground coffee into a selected sub-chamber. The chamber divider 174 can be manually or electromechanically rotated to cycle through the various sub-chambers. Each sub-chamber can be brewed in sequence. The flight water dispensing nozzle 174 is preferably a modified version of the water dispensing nozzle 114 that includes outlets only over a predefined position. The flight water dispensing nozzle 174 can be interchangeable with a standard water dispensing nozzle. Alternatively, the water dispensing nozzle 114 can include mechanical mechanism so as to open/close off a sub-set of outlets to transition between different water dispensing modes. In yet another variation, the system may be designed to accommodate simultaneous brewing of at least two sub-chambers. For example, the water system no may dispense water equally to multiple sub-chambers or there may be multiple processing loops 122 used to control dissolved solids in each sub-chamber.

The coffee flight system 170 is preferably used in combination with the other components, but the coffee flight system 170 may alternatively be used with other alternative coffee maker systems. An embodiment of the coffee flight system may include a brew chamber 120 and the coffee flight system 170, which may be used with regular coffee maker systems. The brew chamber 120 can include a set of dispensing outlets, with at least one dispensing outlet for each sub-chamber established by the coffee flight system 170. Additionally, a water dispensing head preferably dispenses heated water into each of the sub-chambers. In using an embodiment of the coffee flight system 170, a user can prepare each sub-chamber with different coffee grounds and then activate the brewing cycle of the coffee maker.

3. Method

Figure 15:
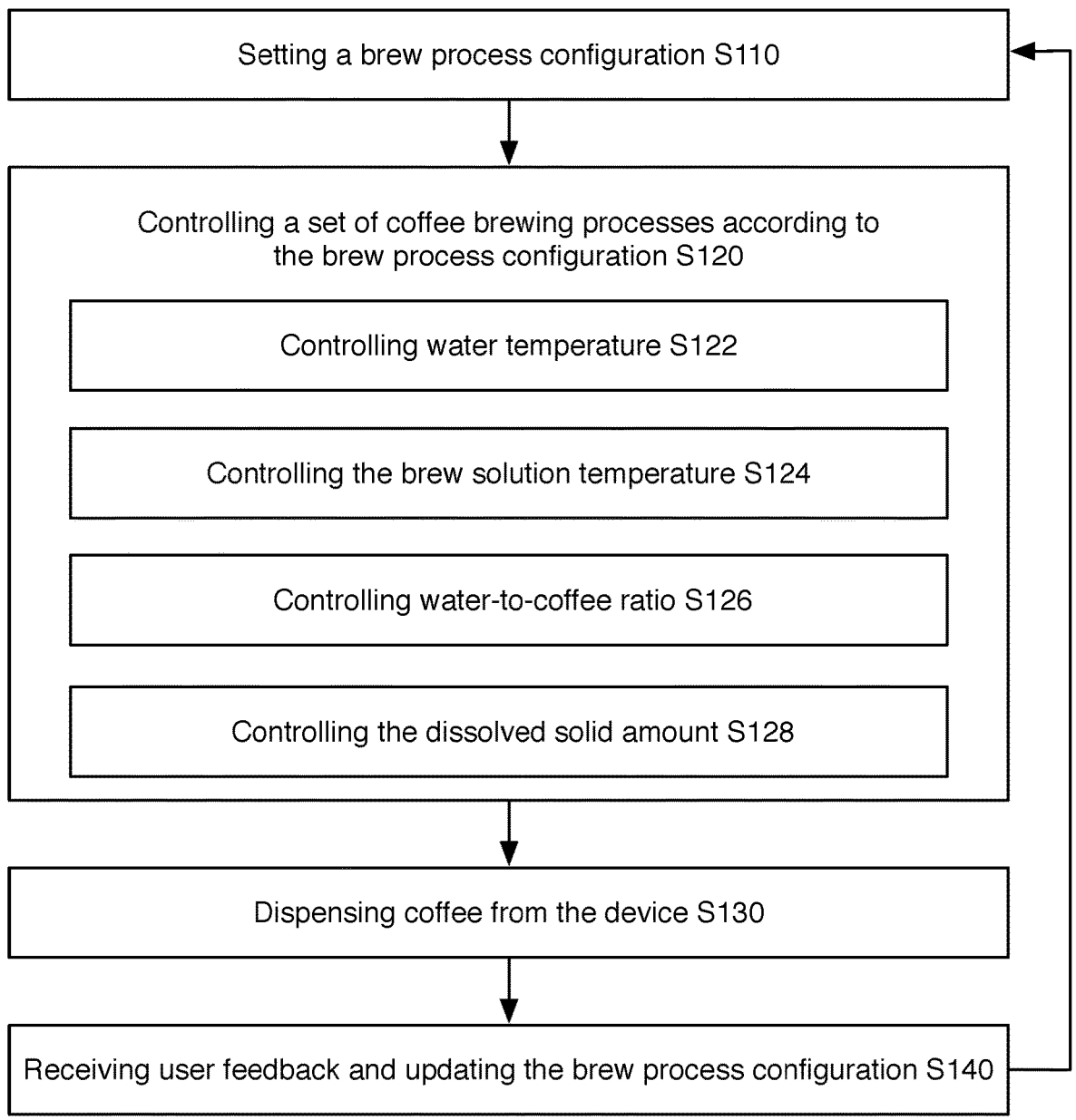
FIG. 15 is a flowchart representation of a method of a preferred embodiment.

As shown in FIG. 15, a method for controlling the brew process of a coffee maker of a preferred embodiment can include setting a brew process configuration S110, controlling a set of coffee brewing processes according to the brew process configuration S120, and dispensing coffee from the device S130. In particular controlling a set of coffee brewing processes can include controlling water temperature S122, controlling the brew solution temperature S124, controlling water-to-coffee ratio S126, and controlling the dissolved solid amount S128. The method functions to control various properties of the coffee brewing process so that customized brewing of coffee can be automated. Additionally, the method preferably utilizes measurable metrics so that the result of brewing coffee can have enhanced consistency. The method can additionally be applied to brew coffee so as to target particular tastes. For example, brew processes can be pre-defined for various coffee bean sources; the user can simply specify what coffee is being used and a brew style to obtain coffee based on those inputs. Automation and control may additionally or alternatively be applied to adapt a brew process to the preferences of an individual user. Similarly, automation and control maybe used to adapt a brew process to balance or account for the preferences of multiple users. The method can include receiving user feedback and updating the brew process configuration in a subsequent brewing process. Preferences can be applied to particular configurations of coffee. For example, the method may learn how a user likes one particular type of coffee to be brewed. Learned user preferences may additionally be translated to other brewing processes such that when a user tries a new variety of coffee, the user's preference for coffee can be automatically applied to a default brewing process for that coffee variety.

The method is preferably implemented by a system substantially similar to the system described above, but the method may alternatively be implemented and/or used with any suitable system.

Block S110, which includes setting a brew process configuration, functions to define the parameters that will guide a particular instance of a brewing process. The brew process configuration can be automatically set, partially defined by a user, or fully defined by a user. Setting the brew process configuration can include setting of parameters that are applied during subsequent brewing steps in Block S120. Some brew process configuration may include defining the steps or operations completed by the user. For example, the user may need to specify what coffee beans or grounds were added to the device. Similarly, the type of filter used in the device may be selected and specified by a user. The coffee maker can include a variety of operations modes such as an automatic mode, a user-preference mode, a pre-defined brew style, a partial manual controls (e.g., able set the caffeine kick level), or fully manual controls.

Figure 16:
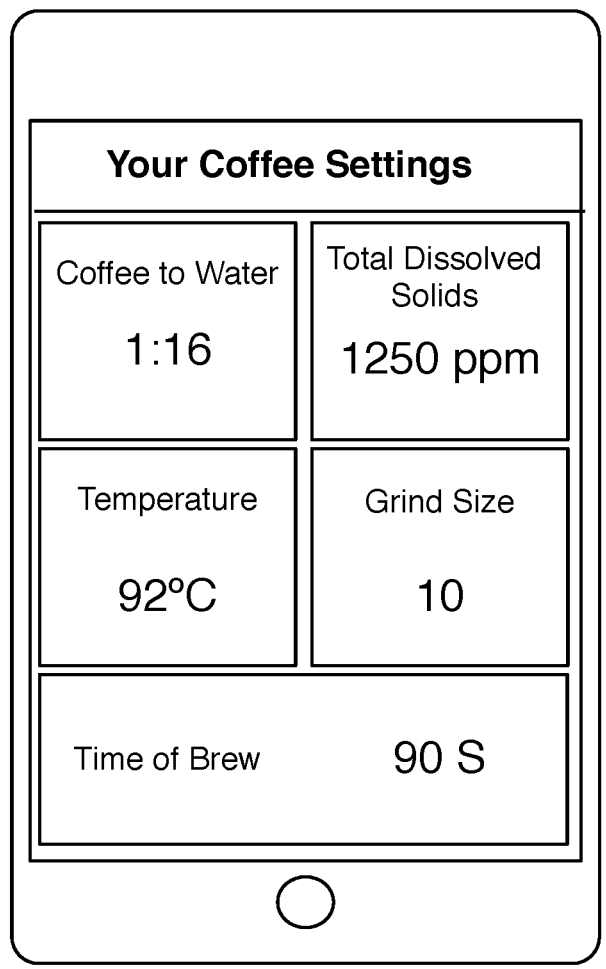
FIG. 16 is an exemplary screenshot of user application used in setting brew process configuration.
Figure 17:
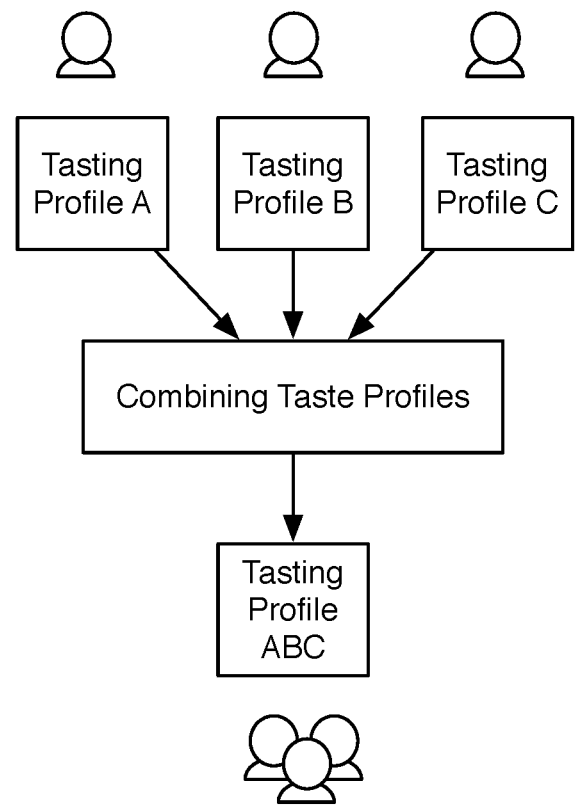
FIG. 17 is a schematic representation of multiple taste profiles used to make a combined taste profile.

In one implementation, the brew process configurations are set in part using a user application operable on the coffee maker system and/or on a secondary device like a smart phone, web-app, a wearable computing device, or any suitable personal computing device. An automatic mode may set the brew process configuration based on previous usage. An automatic mode may initially use default settings until the preferences of the user can be determined. The preferences of the user are preferably determined by collecting feedback after a user tries the dispensed coffee. The settings of an automatic mode may be augmented by the user. In one mode or variation, the automatic mode may include receiving the coffee bean information used for a brew cycle. The brew process configuration can then be set by mapping a taste profile of the user and the coffee bean information to a brew process configuration. In another mode or variation, a property of the resulting coffee or a property of the brew process configuration may be directly set. As shown in FIG. 16, the brew process configuration properties can be shown and edited by a user. A directly set property preferably overrides taste profile preferences of a user when setting the brew process configuration. For example, a user may want to increase the caffeine kick of a cup of coffee just one time. The setting of the brew process configuration can additionally incorporate information from multiple users. In one scenario, a user may want to try a new type of coffee bean/roast. The taste profile of the user can be used to identify users with similar taste profiles using data synchronized to a coffee platform. The preferences of the other users who have tried the new type of coffee can be used to predict the brew process configuration of the original user. In another scenario, a group of user may intend to share the coffee from the coffee maker. When setting up the coffee maker, the taste profiles of each user can be selected, and then a combined taste profile can be generated that approximates the group preferences of the set of users as shown in FIG. 17.

In another implementation, the brew process configurations may be set in part through manual controls. Those manual controls may set particular operating parameters such as a targeted dissolved solid measurement. The manual controls may alternatively be abstracted to more approachable concepts such as caffeine strength between low and high level.

Block S120, which includes controlling a set of coffee brewing processes according to the brew process configuration, functions to apply the configuration to brew coffee that targets a particular taste-profile. The method can control water temperature, brew solution temperature, water-to-coffee ratios, and/or amount of dissolved coffee particles to adjust the taste-profile. In a preferred variation, a coffee maker system can utilize sensor measurements in controlling aspects of the brew cycle. In some alternative implementations, open loop control can be used to adjust the variables of the brew cycle without any sensed feedback. In one variation, controlling the set of coffee brewing processes can include utilizing trained operating parameters that correspond to the brew process configuration. The trained operating parameters may be based on controlled experiments, but more preferably can be set based on the operation of at least a second coffee maker with sensor feedback. Elevation, weather, water quality, and other factors relating to geographic proximity may impact how the various brew cycle variables are controlled. In some variations, the trained operating parameters are selected based on geographic proximity of a coffee maker (e.g., the sensorless coffee maker) and a coffee maker or makers used in generating the trained operating parameters. For example, a coffee maker will preferably use trained operating parameters from a feedback-enabled coffee maker that is within ten miles of the user over a coffee maker that is over four hundred miles away.

Blocks S122 and S124, which includes controlling water temperature and controlling the brew solution temperature, function to regulate the temperature of the water and/or the brew solution. Controlling temperature can include sensing the temperature of the water and/or brew solution and then controlling a heating element that is thermally coupled to the water and/or brew solution. Controlling a heating element can include activating the heating element to increase the temperature to a target temperature and deactivating the heating element to allow the temperature to fall to a target temperature. In one variation, the water temperature is regulated within the water system, and the brew solution can be regulated within the brew chamber. As described above, the temperature regulation of the water and the brew solution can be integrated so that a single heating element can be used to regulate the temperature of the water and the brew solution. This variation can include circulating the brew solution through tubing that is thermally coupled to a water system and then controlling a heating element to set the temperature of the water or brew solution. The temperature of the water and the brew solution can be modulated to the same temperature.

In one variation, the method can include calibrating the temperature effect of the heating element S125 and utilizing the calibrated temperature effect of the heating element when controlling temperature. Calibrating preferably accounts for performance variation based on various factors such as elevation, local climate, humidity, water quality, and other factors. Calibrating can additionally be used to determine some of the trained operating parameters mentioned above. As shown in FIG. 7, calibrating the temperature effect of the heating element can include setting a target temperature, measuring the time and/or energy required to satisfy the target temperature, and measuring the temperature fluctuation at steady-state. This calibration process is preferably performed for multiple target temperatures. In one implementation, the target temperatures are set at ten degree Celsius increments within a temperature operating range. A calibration value is set and then used during subsequent usage. In one implementation, the calibration is incrementally tuned until the temperature response of heating is satisfactory. For example, if it takes too long a heating factor is increased if it takes too long to get to the target temperature. If the temperature fluctuation is too high, then the heating factor can be decreased. The heating factor can be tuned for different target temperatures by allowing the temperature to drop back down below the target temperature and repeating the process. Preferably, the temperature is allowed to drop to at least ten degrees below the target temperature.

Block S126, which includes controlling water-to-coffee ratio, functions to regulate, set, or determine the amount of water compared to the amount of ground coffee. Controlling water-to-coffee ration preferably includes sensing through a load cell the amount of brew solution contents added to a brew chamber. The water system can preferably control dispensing state. Similarly, the amount of coffee grounds added may also be controlled if used with a controlled coffee grinder. However, in some designs only one of water or coffee may be controlled. For example, the amount of water added may be adjusted based on a measured amount of coffee grounds. Regulating the water-to-coffee ratio can include measuring weight of water added to the brew station, measuring weight of coffee grounds added to the brew station, and controlling the addition of at least one of water or coffee. The water and coffee can be added to the brew chamber at different times. The coffee grounds are preferably added first, but any suitable order or sequence of ingredient adding may be used. A load cell preferably measures weight. The load cell is preferably integrated within the brew chamber. Alternatively, other suitable sensing approaches may be used such as sensing water or coffee volume added to a brew station.

Block S128, which includes controlling the dissolved solid amount, functions to detect the amount of soluble coffee that is in the brewing solution and augment control of the coffee maker device to target particular dissolved solid counts. Controlling the dissolved solid amount preferably happens while the coffee is brewing. The amount of dissolved coffee can be an indicator of when the brew solution is done brewing. Controlling the dissolved solid amount can include circulating a portion of the brew solution through a total dissolved solids monitoring system and measuring a dissolved solid value during the brew process. The measured dissolved solid value is preferably used in determining the brew condition. For example, if the brew solution reaches a dissolved solid count before a maximum brewing time is reached, the brew solution is dispensed. Monitoring can be continuous but may alternatively be performed periodically or as a check before dispensing the coffee. Monitoring the dissolved solid amount can include circulating the brew solution through a dissolved solid sensing chamber. The circulation of the brew solution preferably uses a processing loop as discussed above. A TDS meter is preferably used in the dissolved solid sensing chamber. The probes of the TDS meter are preferably aligned along a defined plane that is perpendicular to the flow of sampled brew solution. Additionally, a temperature sensor may report the temperature of the brew solution inspected by the total dissolved solids monitoring system. The temperature can be used to calibrate or otherwise calculate the dissolved solid value. The brew solution is preferably recirculated back into the brew chamber for continued brewing. Alternatively, sampled brew solution can be deposited into a waste chamber, drip tray, or other suitable receptacle. The amount of dissolved solids in the brew solution is preferably monitored until brew solution conditions are satisfied. The brew solution conditions are defined according to the brew process configuration. Preferably, the brew solution brews until a defined threshold is satisfied. The brew time may additionally be used in the condition. For example, there may be a minimum and/or maximum amount of time to brew the coffee.

Block S130, which includes dispensing coffee from the device functions to dispense coffee into a receptacle such as a carafe or a coffee cup. As discussed above a processing loop may be used to recirculate brew solution within the brew chamber. A controllable valve may be operable to switch flow of the brew solution to the processing loop or to a dispensing nozzle. Accordingly, dispensing coffee from the device can include redirecting flow of brew solution away from the processing loop and to the dispensing nozzle. Alternatively, a dispensing valve may be distinct from a processing loop valve, and the dispensing valve can be opened to dispense the coffee. Coffee is preferably dispensed when the conditions of the brew process are satisfied. For example, the coffee is preferably left to brew until the amount of dissolved solids in the brew solution reaches a particular threshold.

The method can additionally include receiving user feedback and updating the brew process configuration in a subsequent brewing process S140. User feedback may be received through a user interface of the coffee making device or an application operable on a secondary device such as a smart phone, tablet, wearable computer, desktop/laptop computer, or other suitable computing device. The user can rate the coffee. Preferably, the user feedback includes feedback for various properties of the coffee such as bitterness, strength, caffeine strength, and texture. The user feedback can then be used to update a taste profile. A taste profile can be a data construct that defines various preferences of a user. A taste profile can be associated with a user or a particular coffee maker. In one variation, the taste profile can be a set of preference ranges for different properties of coffee, but any suitable set of values, properties, classifications, or other parameters can be used in defining the taste profile. In one preferred implementation, a user will setup an account with a coffee platform. Multiple instances of user feedback by a user can be collected by the coffee platform in association with an account of the user. The feedback can be correlated with the configured brew process associated with each instance of user feedback. The taste profile may be updated after each subsequent instance of feedback. The method may alternatively use the history of user feedback and associated brew processes to dynamically create a recommended brewing process for a given set of parameters. For example, with no provided constraints, the method could use the user feedback history to recommend a coffee brewing process including specifying the coffee bean type. In another example, a user may select a type of coffee bean purchased at a store and the method can automatically determine the brewing process for that type of coffee bean to match the user's taste profile. Machine learning or other computational approaches may be used to update a taste profile.

Figure 18:
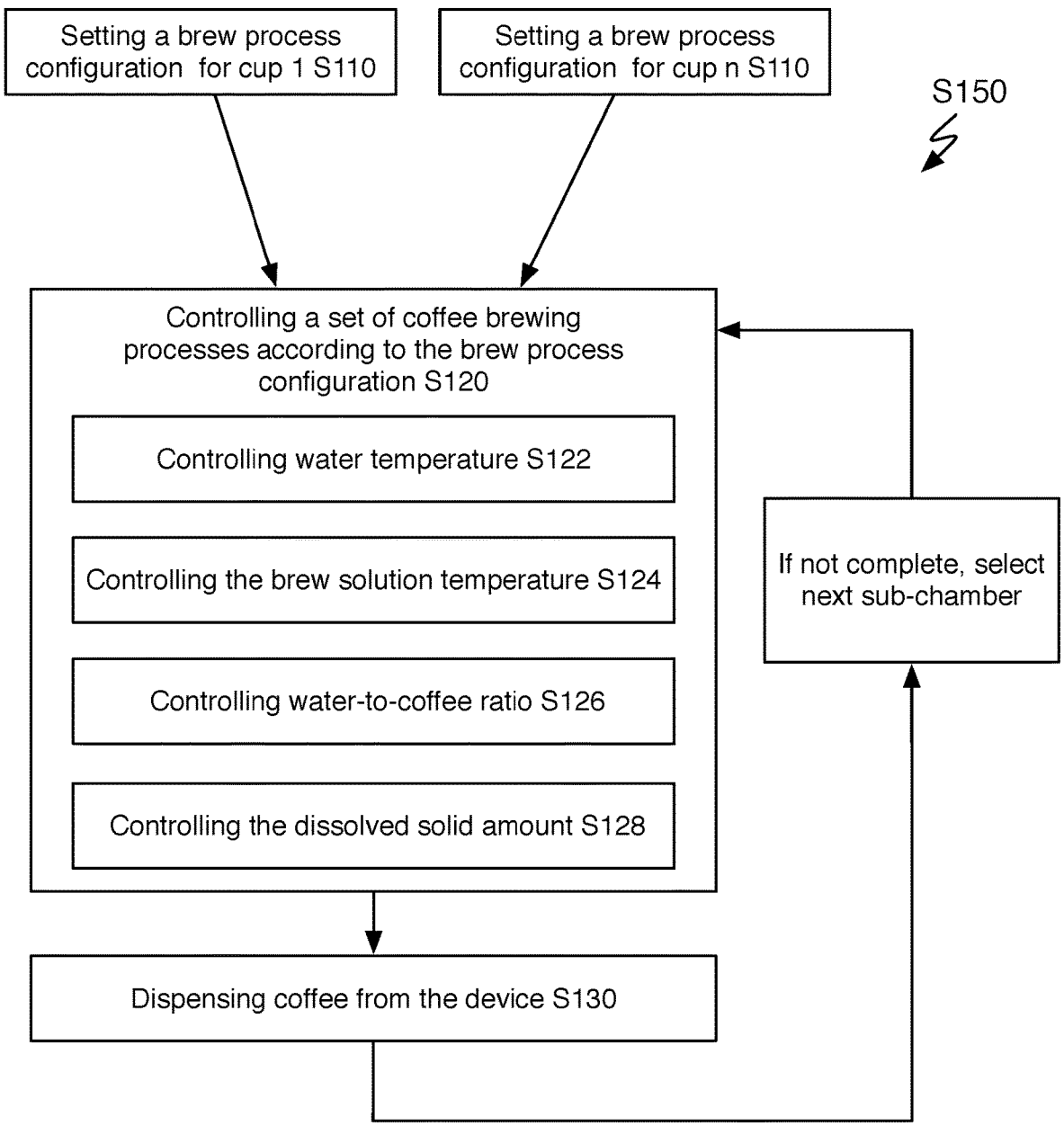
FIG. 18 is a flowchart representation of a coffee flight variation of a method of a preferred embodiment.
Figure 19:
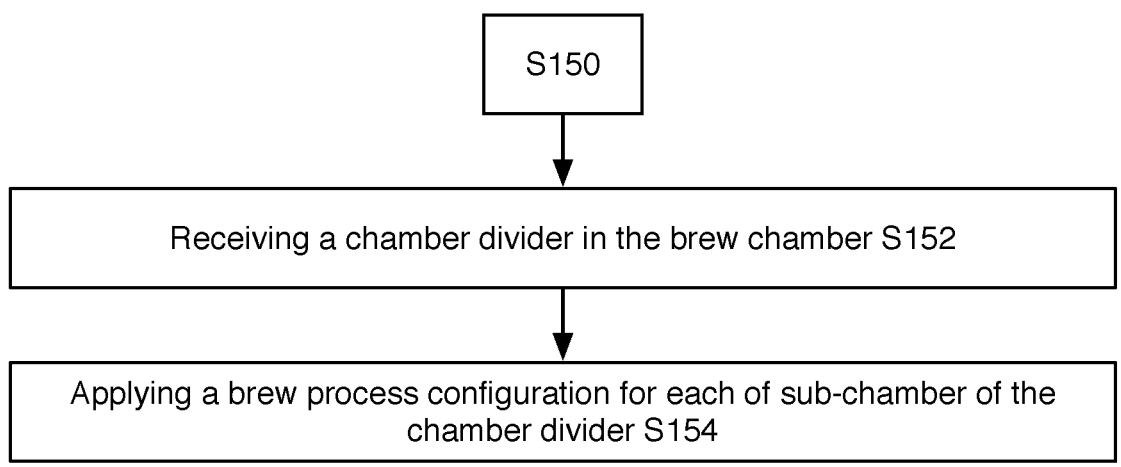
FIG. 19 is a flowchart representation of detailed process of a coffee flight variation.

Additionally or alternatively, the method can include applying the method to brewing a set of coffee portions according to different brew process configurations S150, which can function to enable a flight of coffee tastings as shown in FIG. 18. While this "coffee flight" variation is preferably used in making multiple cups of coffee for a tasting. The "coffee flight" variation may alternatively be applied to producing individualized cups of coffee for different users or any suitable application. The "coffee flight" variation can include receiving a chamber divider in the brew chamber S152 and applying a brew process configuration for each of sub-chamber of the chamber divider S154 as shown in FIG. 19. The chamber divider preferably divides the brew chamber into a set of separated sub-chambers, wherein a different brew process can be executed for each sub-chamber. At least two sub-chambers are preferably established, but any suitable number of sub-chambers can be established. Alternatively, the device of the "coffee flight" variation can include a permanent chamber divider. The brewing process can include setting a brew process configuration for a sub-chamber, selecting a sub-chamber, controlling a set of coffee brewing processes according to a brew process configuration of the selected sub-chamber, and dispensing coffee from the selected sub-chamber.

In one implementation, the system can execute the coffee brewing process within a single sub-chamber at a time, and the set of sub-chambers are selected and brewed in sequence. So after dispensing coffee for a first sub-chamber, the device can transition to brewing a second sub-chamber. Selecting a sub-chamber can include actuating the relative position of a sub-chamber and the various brewing apparatuses used in conducting a brew process such as a process loop inlet and outlet, water dispensing area, coffee ground dispensing area, and finished coffee dispensing outlet. Actuation can be mechanical repositioning executed under user intervention such as the user rotating the brew chamber. Actuation may alternatively be electromechanically controlled.

In another implementation, the system can execute the coffee brewing process of two sub-chambers simultaneously. The coffee grounds are preferably loaded into each sub-chamber. Heated water can be dispensed into the sub-chambers at the same controlled temperature. While, the brew solution is brewing, alternating or parallel sampling of the at least two sub-chambers can be performed to measure dissolved particles and/or to recirculate heated brew solution. Individually controlled dispensing valves could be used to dispense the coffee when each sub-chamber satisfies a brew condition.

The "coffee flight" variation can be used to prepare multiple styles of coffee from the same or different beans. This can provide variety to the one or more people drinking the coffee. In some variations, the "coffee flight" variation is used in using direct comparisons of brew process configurations to refine a taste profile of a user. The user preferably can try two or more styles of coffee and then indicate preferences between the two coffees. Accordingly, the method can include receiving user selection of coffee dispensed from a preferred sub-chamber and updating the taste profile of a user based on the brew process configuration of the preferred sub-chamber. For example, for three different coffee samples, the user can indicate which one she preferred and/or which was least preferred. The brew process configuration used for each one in combination with the bean/grind information can be used to update taste profile preferences of the user.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A coffee brewing system comprising:
   a brew chamber that holds a brew solution during a brew cycle and dispenses the brew solution;
   a water system that is integrated to dispense water into the brew chamber;
   a content sensing system that measures the brew solution contents added to the brew chamber;
   a temperature control system with a heating element and a temperature sensor, wherein the heating element of the temperature control system directly heats liquid in the water system;
   at least one recirculating processing loop with a particle monitor system, wherein the recirculating processing loop circulates brew solution extracted from the brew chamber, wherein the recirculating processing loop comprises a subsection that is thermally coupled to the water system such that the heating element indirectly heats brew solution circulated through the processing loop; and
   a control system that is communicatively coupled to the content sensing system, the temperature control system and the particle monitor system during a brew cycle, wherein the control system controls a brew cycle based on a selected a specified taste profile.

2. The system of claim 1, wherein the specified taste profile is selected from a set of taste profiles with each taste profile associated with a distinct user.

3. The system of claim 1, further comprising a user application that collects user feedback on dispensed coffee, wherein the user feedback is used in part to augment a brew process configuration of a second brew cycle of the coffee maker.

4. The system of claim 3, wherein the user feedback is used in combination with a selected bean type to determine the brew process configuration used by the control system during the second brew cycle.

5. The system of claim 1, further comprising a set of manual controls that define the taste profile settings referenced by the control system.

6. The system of claim 1, further comprising a coffee grinding system with a grind outlet positioned to deliver coffee grounds to the brew chamber, wherein the grind size and quantity of produced coffee grounds is controlled by the control system.

7. The system of claim 1, wherein the control system includes a calibration mode, wherein the heating effect of the temperature control system is calibrated and accounted for in directing control of the temperature control system.

8. The system of claim 1, further comprising a tasting flight system that can be removably added to a brew chamber while the control system operates in a tasting flight mode; wherein the tasting flight system comprises at least a chamber divider segmenting the brew chamber into multiple sub-chambers and a chamber selection system through which the control system can individually control the brew cycle of each sub-chamber.

9. A coffee brewing system comprising:
- a brew chamber that holds a brew solution during a brew cycle and dispenses the brew solution;
- a water system is integrated to dispense water into the brew chamber;
- a content sensing system that measures the brew solution contents added to the brew chamber;
- a temperature control system with a heating element and a temperature sensor;
- at least one recirculating processing loop with a particle monitor system, wherein the recirculating processing loop circulates brew solution extracted from the brew chamber;
- a control system that is communicatively coupled to the content sensing system, the temperature control system and the particle monitor system during a brew cycle, wherein the control system controls a brew cycle based on a selected a specified taste profile; and
- a tasting flight system that can be removably added to a brew chamber while the control system operates in a tasting flight mode, the tasting flight system comprising: a chamber divider segmenting the brew chamber into multiple sub-chambers and a chamber selection system through which the control system can individually control the brew cycle of each sub-chamber.

10. The system of claim 9, wherein the specified taste profile is selected from a set of taste profiles with each taste profile associated with a distinct user.

11. The system of claim 9, further comprising a user application that collects user feedback on dispensed coffee, wherein the user feedback is used in part to augment a brew process configuration of a second brew cycle of the coffee maker.

12. The system of claim 11, wherein the user feedback is used in combination with a selected bean type to determine the brew process configuration used by the control system during the second brew cycle.

13. The system of claim 9, further comprising a set of manual controls that define the taste profile settings referenced by the control system.

14. The system of claim 9, further comprising a coffee grinding system with a grind outlet positioned to deliver coffee grounds to the brew chamber, wherein the grind size and quantity of produced coffee grounds is controlled by the control system.

15. The system of claim 9, wherein the heating element of the temperature control system directly heats liquid in the water system; and wherein the processing loop comprises a subsection that is thermally coupled to the water system such that the heating element indirectly heats brew solution circulated through the processing loop.

16. The system of claim 9, wherein the control system includes a calibration mode, wherein the heating effect of the temperature control system is calibrated and accounted for in directing control of the temperature control system.

* * * * *